United States Patent
Shabah

(10) Patent No.: US 10,553,104 B2
(45) Date of Patent: Feb. 4, 2020

(54) SYSTEM AND METHOD FOR WORKFLOW MANAGEMENT IN ISOLATED ENVIRONMENTS

(71) Applicant: ABDO SHABAH MD INC., Montreal (CA)

(72) Inventor: Abdo Shabah, Montreal (CA)

(73) Assignee: ABDO SHABAH MD INC., Montreal, Quebec (CA)

( * ) Notice: Subject to any disclaimer, the term of this patent is extended or adjusted under 35 U.S.C. 154(b) by 0 days.

(21) Appl. No.: 15/573,779

(22) PCT Filed: May 13, 2016

(86) PCT No.: PCT/CA2016/050552
§ 371 (c)(1),
(2) Date: Nov. 13, 2017

(87) PCT Pub. No.: WO2016/179710
PCT Pub. Date: Nov. 17, 2016

(65) Prior Publication Data
US 2018/0096588 A1     Apr. 5, 2018

Related U.S. Application Data

(60) Provisional application No. 62/248,854, filed on Oct. 30, 2015, provisional application No. 62/160,947, filed on May 13, 2015.

(51) Int. Cl.
*H04W 4/90*     (2018.01)
*H04W 84/18*    (2009.01)
(Continued)

(52) U.S. Cl.
CPC ..... *G08B 27/001* (2013.01); *G06Q 10/06311* (2013.01); *G06Q 50/265* (2013.01);
(Continued)

(58) Field of Classification Search
CPC . G08B 27/001; H04L 67/1091; H04L 67/306; G06Q 10/06311; G06Q 50/265;
(Continued)

(56) References Cited

U.S. PATENT DOCUMENTS

2007/0214046 A1    9/2007  Falchuk et al.
2009/0284348 A1*  11/2009  Pfeffer ................ G08B 25/006
                                              340/7.3

(Continued)

FOREIGN PATENT DOCUMENTS

WO    WO 2011/060388    5/2011
WO    WO 2014/066016    5/2014

OTHER PUBLICATIONS

Geert De Cubber et al., "UAS deployment and data processing during the Balkans flooding", *Proceedings of 12th IEEE International Symposium on Safety, Security and Rescue Robotics (SSRR 2014)*, Oct. 27-30, 2014, in Hokkaido, Japan.

(Continued)

*Primary Examiner* — Dong-Chang Shiue
(74) *Attorney, Agent, or Firm* — Pearl Cohen Zedek Latzer Baratz LLP

(57) ABSTRACT

A workflow management system is provided. The system includes a plurality of communication devices interconnected to form an ad hoc network. Mobile devices of the communication devices are each associated to a user and stores a user profile of the user. The system also includes a workflow management module configured to assign tasks to users via task assignments transmitted to the mobile devices and to modify the assigned task based on changes to status of tasks, change in available mobile devices and/or changes in situational status affecting the ad hoc network. A method for managing workflow is also provided.

45 Claims, 12 Drawing Sheets

(51) Int. Cl.
| | |
|---|---|
| *G08B 27/00* | (2006.01) |
| *H04W 4/80* | (2018.01) |
| *H04W 76/50* | (2018.01) |
| *G06Q 10/06* | (2012.01) |
| *G06Q 50/26* | (2012.01) |
| *H04B 7/185* | (2006.01) |
| *H04L 29/08* | (2006.01) |
| *H04W 4/021* | (2018.01) |
| *H04W 4/08* | (2009.01) |
| *H04W 8/00* | (2009.01) |

(52) U.S. Cl.
CPC ..... *H04B 7/18504* (2013.01); *H04L 67/1091* (2013.01); *H04L 67/306* (2013.01); *H04W 4/021* (2013.01); *H04W 4/08* (2013.01); *H04W 4/80* (2018.02); *H04W 4/90* (2018.02); *H04W 8/005* (2013.01); *H04W 76/50* (2018.02); *H04W 84/18* (2013.01)

(58) Field of Classification Search
CPC .......... G06Q 10/0633; H04B 7/18504; H04W 76/50; H04W 8/005; H04W 4/08; H04W 4/021; H04W 4/90; H04W 4/80; H04W 4/22; H04W 84/18
See application file for complete search history.

(56) References Cited

U.S. PATENT DOCUMENTS

| | | | |
|---|---|---|---|
| 2010/0150122 A1* | 6/2010 | Berger | H04W 4/90 370/338 |
| 2011/0117878 A1* | 5/2011 | Barash | H04W 4/90 455/404.2 |
| 2011/0130636 A1* | 6/2011 | Daniel | G08B 25/016 600/301 |
| 2012/0150122 A1 | 6/2012 | Beverly | |

OTHER PUBLICATIONS

Hajo A. Reijers et al., "Workflow management systems + swarm intelligence = dynamic task assignment for emergency management applications" in Gustavo Alonso, Peter Dadam & Michael Rosemann, eds., *Business Process Management, LNCS 4714, Proceedings of 5th International Conference on Business Process Management (BPM 2007)*, Sep. 24-28, 2007, Brisbane, Australia.

International Search Report of International Application No. PCT/CA2016/050552, dated Jun. 22, 2016.

* cited by examiner

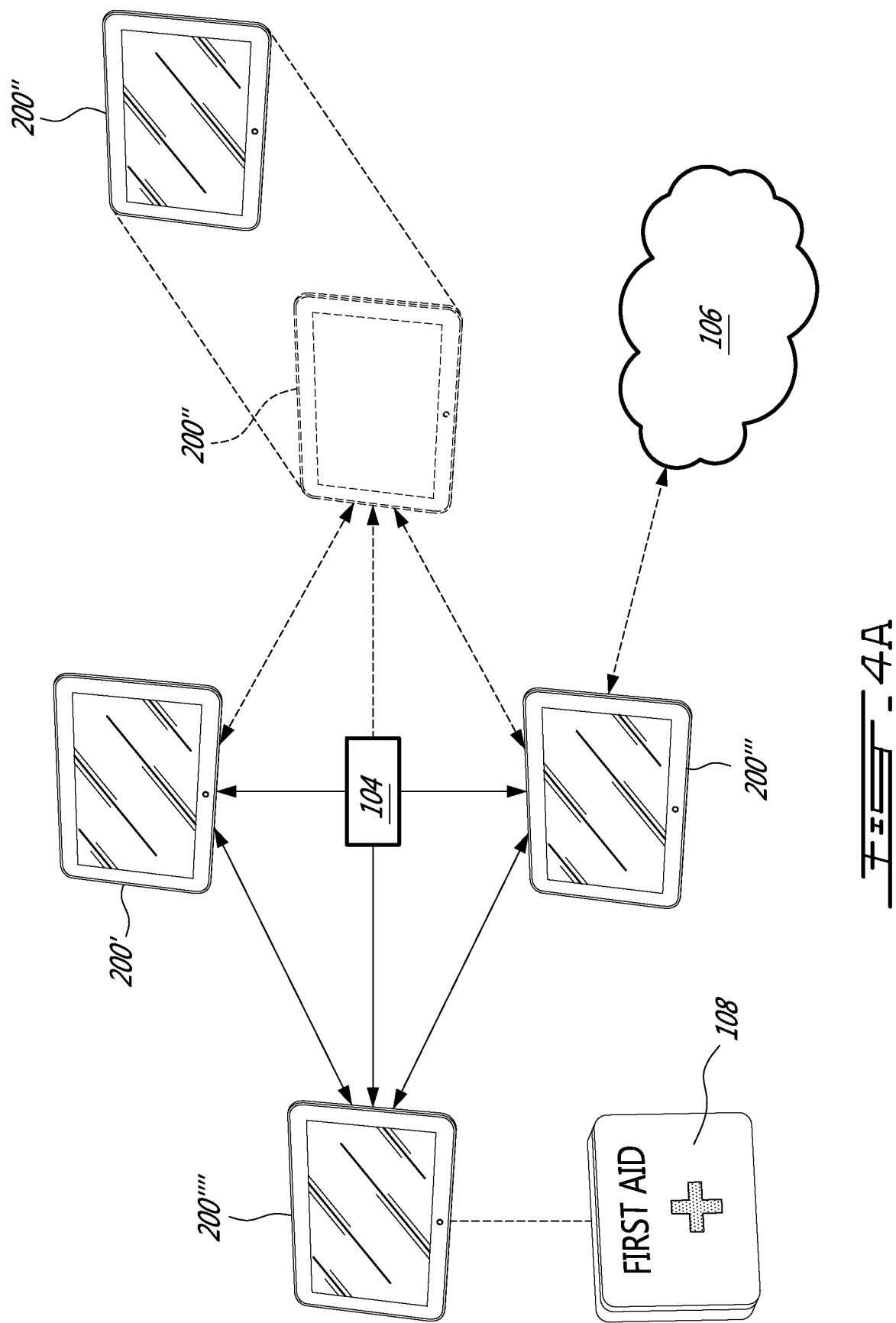

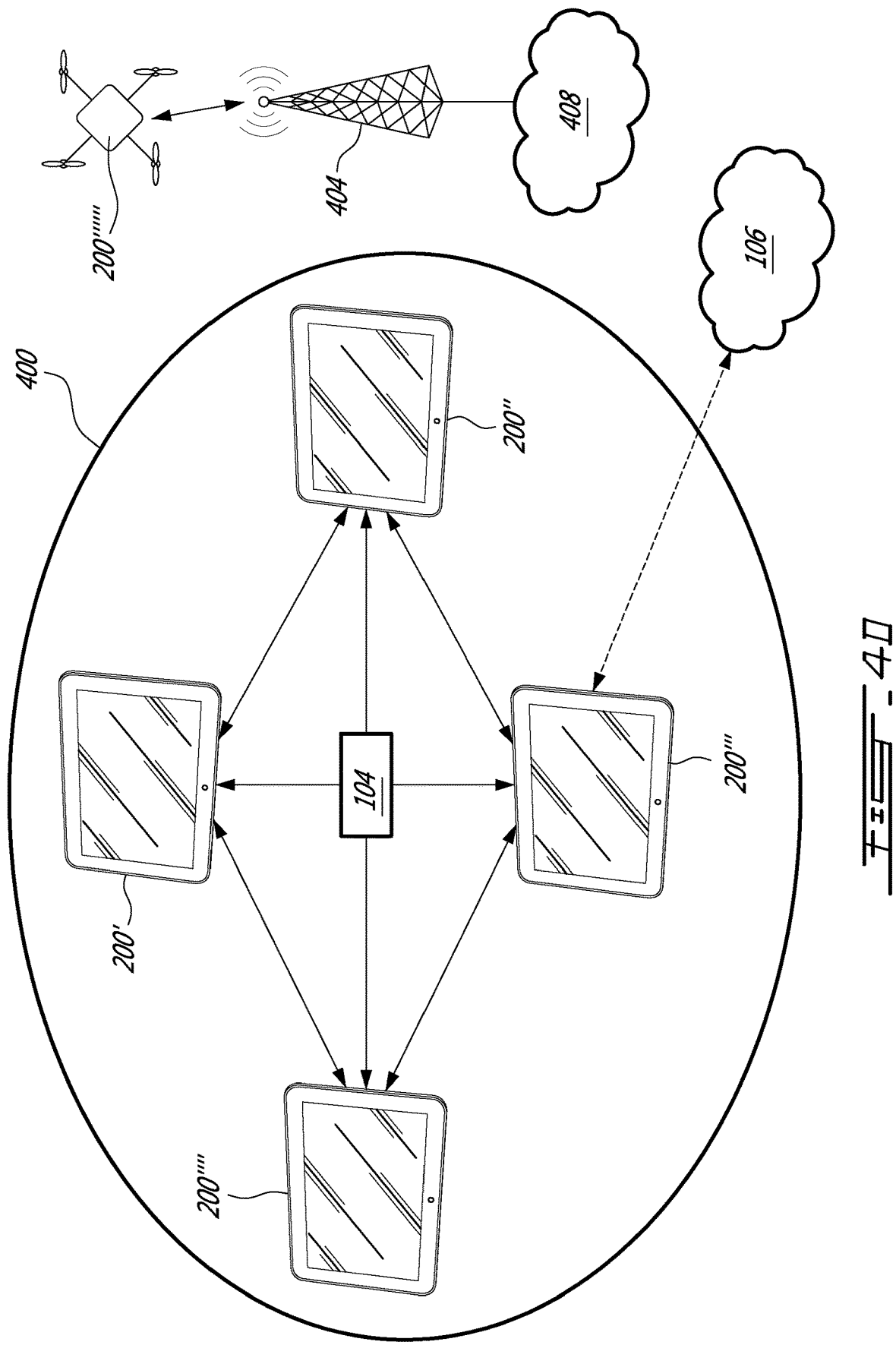

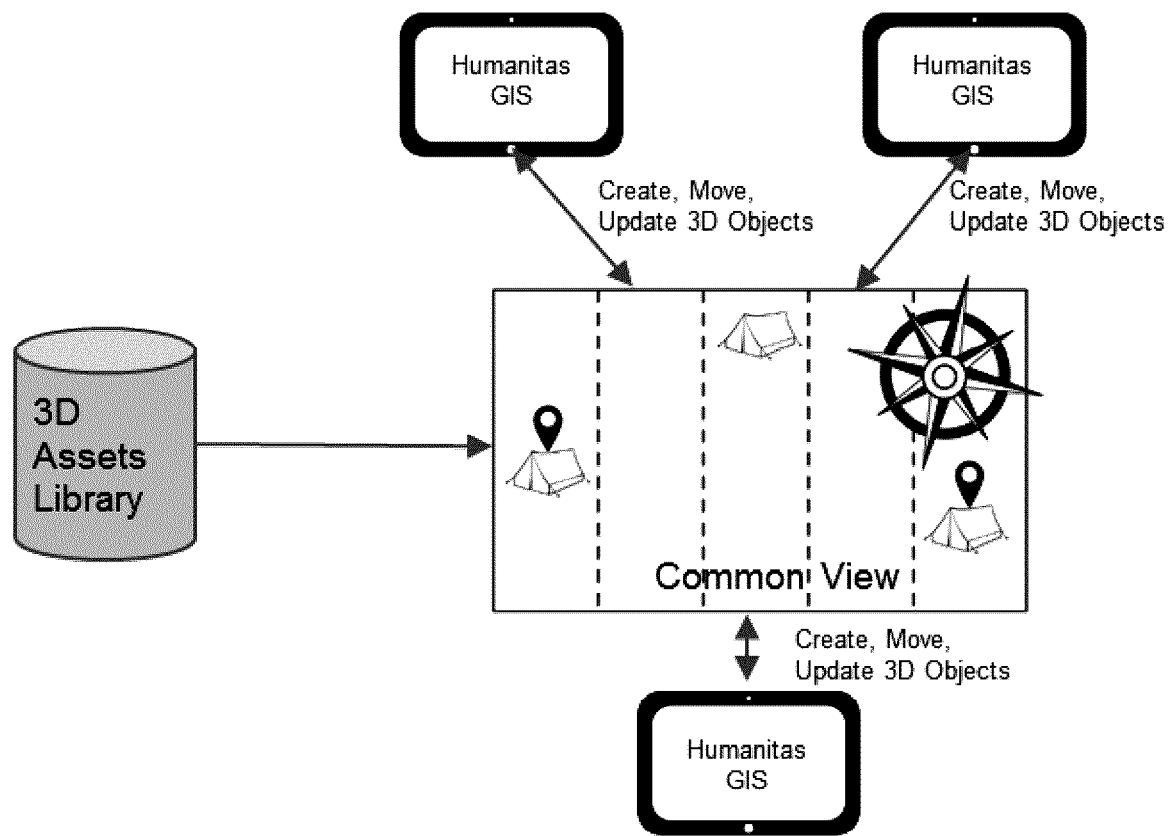

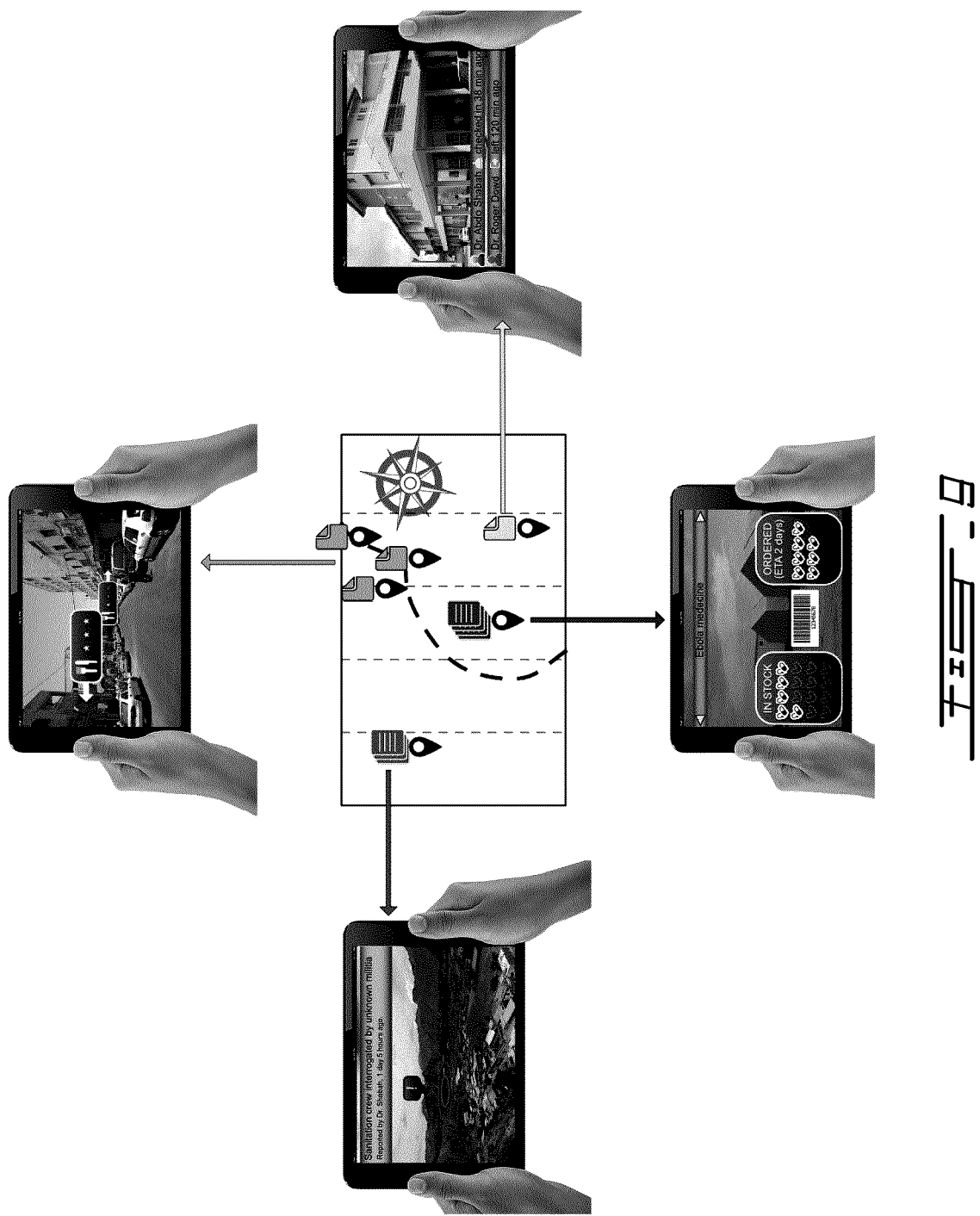

SYSTEM AND METHOD FOR WORKFLOW MANAGEMENT IN ISOLATED ENVIRONMENTS

CROSS REFERENCE

The present application is a National Phase Application of PCT International Application No. PCT/CA2016/050552, International Filing Date May 13, 2016, which claims priority from U.S. provisional patent application No. 62/160,947, filed May 13, 2015 and entitled: "SYSTEM AND METHOD FOR WORKFLOW MANAGEMENT IN ISOLATED ENVIRONMENTS" and from U.S. provisional patent application No. 62/248,854, filed Oct. 30, 2015 and entitled: "SYSTEM AND METHOD FOR WORKFLOW MANAGEMENT IN ISOLATED ENVIRONMENTS", the disclosures of which are hereby incorporated by reference in their entirety.

TECHNICAL FIELD

The present disclosure relates to the field of workflow management in isolated environments. More particularly, the present disclosure relates to an adaptive communication system which allows users to communicate in emergency situations, and a method of operation thereof.

BACKGROUND

In emergency situations, such as natural disasters, epidemic alerts, terrorist attacks or the like, the actions of a large number of workers often need to be coordinated in order to provide an efficient response. Specially designed communications systems therefore need to be provided so that relevant instructions and/or information can be obtained and/or transmitted from and to the workers on site.

Known to the applicant are different emergency communications systems designed to manage known and/or well defined emergency situations. These systems, however, suffer from several drawbacks. For example, these systems are not designed to adapt to new or unknown situations which are outside the scope for which the system was originally designed. Moreover, known systems are designed for a specific composition of workers and cannot adapt to changing user profiles, thereby limiting the effectiveness of coordinating available resources. What's more, workers in emergency situations must often work in physically or digitally isolated environments, making it difficult to communicate effectively.

In view of the above, there is a need for an improved workflow management system which would be able to overcome or at least minimize some of the above-discussed prior art concerns.

BRIEF SUMMARY OF THE INVENTION

According to a general aspect, a workflow management system is provided. The system is operable within an emergency response communication system, which comprises a plurality of communication devices. The plurality of communication devices are interconnected to form a wireless ad hoc network, at least one of the plurality of communication device being associated to a user profile specific to a particular user. The system also includes workflow management module operatively connected to the network. The workflow management module is configured to adaptively manage a workflow through management of data communication between the communication devices, in real-time, and according to the user profile associated with each one of the communication devices forming the network.

According to another general aspect, there is provided a workflow management system that includes a first set of a plurality of communication devices in data communication with one another over a first ad hoc network, the first set comprising a subset of mobile devices each being associated with a task-executing user and storing a user profile of the task-executing user. The set includes a subset of at least one dispatching device implementing a workflow management module being configured to transmit task assignments to one or more of the mobile devices based in part on the user profiles stored on the mobile devices and to transmit at least a first modified task assignment to at least one mobile device in response to a change in the subset of mobile devices within the ad hoc network.

According to yet another general aspect, there is provided a workflow management system that includes a first set of communication devices being in data communication with one another over a first ad hoc network. The first set includes a first subset of mobile devices associated with a first group of task-executing users. Each mobile device of the first subset is associated with a task-executing user of the first group and stores a user profile thereof. The first set also includes a first subset of at least one dispatching device implementing a first workflow management module being configured to transmit task assignments to the first subset of mobile devices. The workflow management system further includes a second set of communication devices being in data communication with one another over a second ad hoc network discrete from the first ad hoc network. The second set includes a second subset of mobile devices associated with a second group of task-executing users, each mobile device of the second subset being associated with a task-executing user of the second group and storing a user profile thereof. The second set also includes a second subset of at least one dispatching device implementing a second workflow management module being configured to transmit task assignments to the second subset of mobile devices. The first set of communication devices includes at least one first externally communicating device and the second set of communication devices includes at least one second externally communicating device, the second externally communicating device being operable to receive workflow-related data from the first externally communicating device and the second workflow management module being further configured to transmit at least one modified task assignment to at least one mobile device of the second subset of mobile devices in response to the received workflow-related data.

According to yet another general aspect, there is provided a method of managing workflow of task-executing users each being associated to a mobile device connected over an ad hoc network. The method includes monitoring the ad hoc network to determine a set of mobile devices currently available for data communication over the ad hoc network, transmitting over the ad hoc network at least one task assignment to at least one currently available mobile device, each task assignment defining a real-world task to be completed by the user associated to the mobile device, detecting a change in the set of currently available mobile devices, and transmitting at least one modified task assignment to the at least one currently available mobile device, each modified task defining a modification to the real-world task to be completed by the user associated to the mobile device.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIG. 4A illustrates a schematic diagram of a workflow management system subsequent to a communication device becoming unavailable;

FIG. 4D illustrates a schematic diagram of a workflow management system in which the automated device has been displaced outside of an operating zone;

FIG. 8 is a schematic illustrating an architecture for creating a common view of an emergency area, according to an embodiment;

FIG. 9 is a schematic illustrating augmented reality views on communication devices, according to an embodiment.

DETAILED DESCRIPTION

Figure 1:
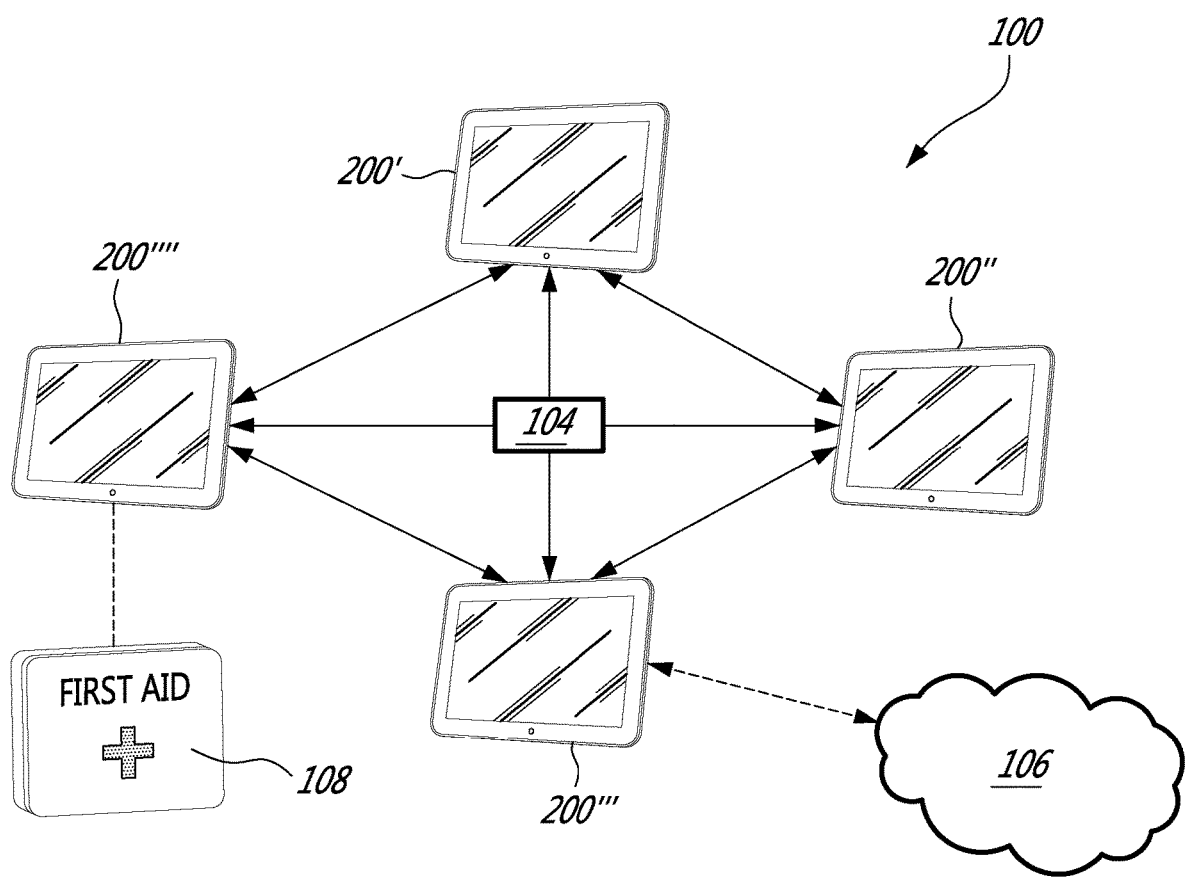
FIG. 1 is a schematic representation of a workflow management system, according to an embodiment.

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the system and method for workflow management in an isolated environment and corresponding components thereof consist of certain configurations as explained and illustrated herein, not all of these components and configurations are essential and thus should not be taken in their restrictive sense. It should be understood that, as also apparent to a person skilled in the art, other suitable components and cooperation therebetween may be used, as will be briefly explained herein and as can be easily inferred herefrom by a person skilled in the art.

A "response site" herein refers to a site which requires intervention from a plurality of task-executing users. An event may have occurred at the response site that creates the need for the response from a task-executing user. A possible type of event is an emergency situation, such as a natural disaster, epidemic alert, terrorist attack, or the like.

"Situational status" of a response site generally refers to state of the response site at a point in time. The intervention that may be required at the response site at the point in time depends on the situational status at that time.

"Task-executing user", also herein referred to as "worker", herein refers to a human who executes real-world tasks while intervening at the response site. In an emergency situation, the task-executing user may be emergency responder personnel.

"Workflow" herein refers to a sequence of steps to be carried out for accomplishing an activity. Steps of the workflow may include tasks that have been carried out by task-executing users while intervening at the response site, tasks that have been assigned to task-executing users, and tasks that have yet to be completed. A step may further include an input or an output of information, either manually by a user and/or automatically via a processor, a sensor device and/or the like. A step may further include a processing of information. Thus, a step of the workflow may be carried out by a processor of one of the devices.

"Automated device", which may include an UAV, herein refers a communication device that is operable to be displaced and provide data communication.

In general terms, the present description relates to a system and method for managing workflows in real-time, and which may be applied in isolated environment. More particularly, a computerized communication system is provided. The system is configured to allow adaptive communications between workers and/or devices, such as in isolated environments, such as an emergency assistance site. The communications are adapted based on multiple factors such as, for example, the profiles of the different workers (for example, the role, etc.), the knowledge and/or expertise of the worker, the tools or other resources possessed by or accessible to the workers, the geographic layout of the site, the relative locations of workers within the site, changes at the site (in terms of personnel and/or resources), and the like.

With reference to FIG. 1, a general schematic shows that the workflow management system can be provided with an emergency response system 100. The system 100 includes a plurality of communication devices 200 interconnected to one another via an ad hoc network 104. Accordingly, the communication devices 200 are in data communication with one another over the ad hoc network 104. The ad hoc network 104 could be, for example, a mobile ad hoc network (MANET), or a wireless mesh network, where each communication device 200 acts as a node and relays data for the network 104. One skilled in the art will understand that the ad hoc network 104 can be implemented with various wireless technologies and according to a variety of configurations in order to allow the plurality of communication devices 200 to cooperate in the distribution of data over the network 104.

The communication device 200 can be any type of device which is capable of sending/receiving instructions and communicating with other devices. The devices 200 can include computing devices having a processor and memory, and may include any combination of smartphones, tablets, or laptop computers operable by a user. In some embodiments, the devices 200 could include hardware particularly design and adapted for emergency situations. In some embodiments, the device 200 could include other automated hardware, such as remotely operated vehicles or drones.

The communication devices 200 include a subset of mobile devices associated to task-executing users. Each mobile device is associated to a task-executing user and also stores a user profile of that task-executing user. In the example illustrated in FIG. 1, each of the communication devices 200', 200", 200''' and 200'''' are mobile devices. The user profile provides information pertaining to the task-executing user that is using a particular mobile device. In the context of an emergency response situation, the user profile may include information pertaining to the qualifications of the emergency responder.

As described elsewhere, the communication devices 200 forming the ad hoc network may also include one or more sensing communication devices, externally communicating and/or dispatching devices. It will be understood that a communication device may assume a plurality of roles at the same time.

A communication device 200 may be associated with a particular set of resources. For example, in the illustrated embodiment, device 200''' is an externally communicating device and has a communication link with an external device or network 106, such as a cloud server or the internet for example. The other devices, however, do not have such a communication link. This can be the case, for example, due to hardware limitations of the other devices, or due to the external network or device 106 being temporarily unavailable due to geographical isolation of the devices. As another example, device 200'''' in the present embodiment is associated with medical supplies 108 which may be useful in responding to particular emergency situations. Although not illustrated, it should be understood that each of the devices 200 could be associated with other types of resources, such as data or tools useful in different types of emergency situations. As will be explained later on, the workflow management system can be configured to allocate available resources according to the emergency situation.

A communication device 200 may be mobile. For example, a communication device 200 that is a mobile device associated with a task-executing user will be displaced as the user is moving about. The communication device 200 may be an automated device 200 that is operable to be displaced. As described elsewhere herein, the automated device 200 may be self-propelled.

Figure 2:
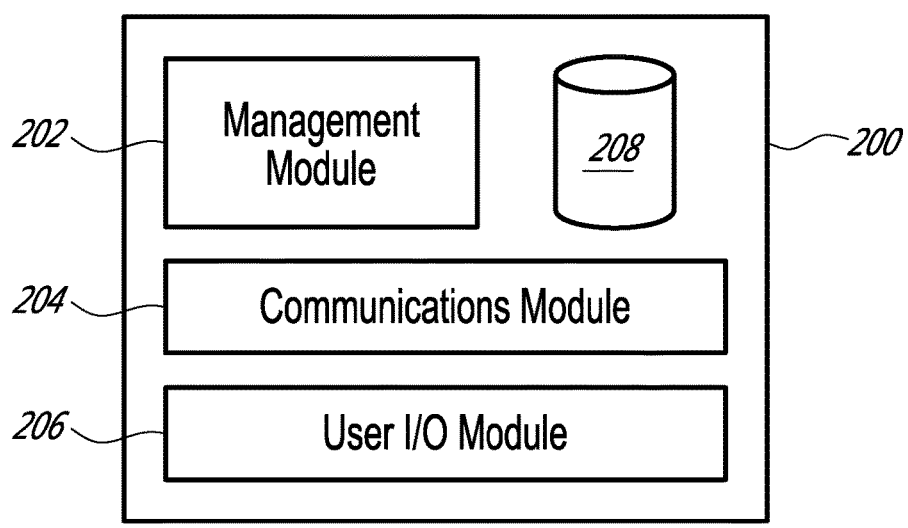
FIG. 2 is a schematic diagram of the operational modules of a mobile device of the workflow management system according to one example embodiment.

FIG. 2 illustrates a schematic diagram of the operational modules of a mobile device associated to a task-executing user according to an example. The operational modules may be implemented in software, hardware or both on the mobile device. In other example examples, some modules may be implemented in combination with modules on other devices, such as within a distributed computing scheme.

The communication device 200 that is a mobile device may include a management submodule 202, a communications module 204, a user input/output (I/O) module and a database 206. While the management submodule 202 has been illustrated as an operational module within a communication device 200 that is mobile device, it will be understood that the management submodule may also be found in one or more other communication devices 200 that participates in the implementing of the workflow management module for the ad hoc network 104, as described elsewhere herein. A communication device 200 that participates in the implementing of the workflow management module is herein referred to as a dispatching device.

The management submodule 202 can participate in serving to manage the workflow. For example, it can determine the necessary tasks to perform during a workflow and dispatch the necessary information to other devices. More particularly, the management submodule 202 can provide instructions to notify a user to perform a specific action, gather information about the status or location devices, prompt a user for specific information, or direct an automated device to perform a particular automated task.

At least one management submodules 202 of at least one communication device 200 implements a workflow management module for the ad hoc network 104. The workflow management module globally manages workflow for the mobile devices of the whole ad hoc network 104. In an embodiment, the workflow manage module is centralized in that it can operate independently on a single communication device 200. In such an embodiment, the communication device 200 running the management module can be thought of as a master device, while other devices are client devices. The management submodule 202 of that device corresponds to the workflow management module for the whole ad hoc network 104.

In another embodiment, the workflow management module is distributed and is implemented from the combination of management submodules 202 of a plurality of communication devices. In such an embodiment, a portion of the management module 202 can run on a plurality of communication devices 200 in the ad hoc network 104.

The communications module 204 can serve to manage communication between devices. It can, for example, handle the receipt and transmittal of information to and from various devices in the network 105, and to external networks 106, if they are available. The communications module 204 can operate using communication hardware in the device 200, such as wireless radios for example. The communications module 204 can be configured to communicate with other devices over a single wireless connection or over several different types of wireless connections simultaneously. In an embodiment, the communications module 204 can be operated by the management submodule 202 in order to collaborate with other devices to manage the workflow.

The user I/O module 206 can serve to provide information to a user and receive feedback. The I/O module 206 can include user interfaces which allow the input of data by a user, for example and without being limitative, through input means such as keyboards, microphone, camera, tactile sensors or the like, and output of information to users for example and without being limitative, through output means such as a display screen, speakers or the like. For example, the I/O module can provide a user with instructions to perform a specific task, and receiving information from the user once the task is complete.

The database 208 can be used to store workflow data. Workflow data can include any information (or component) necessary for the progression of a particular workflow. For example, the workflow data may include steps to be executed, data components to be incorporated in the steps, as well as data fields for receiving input data. The workflow data may also include computer instructions executable to carry out the steps in a workflow. The database 208 can store a plurality of workflows, each workflow containing a sequence of steps or blocks for responding to a particular type of emergency situation. The workflows or portions/components thereof may be predefined, or created by a user for customization to a particular context. The database can also serve to store other workflow data, such as the current state of a workflow, any data gathered during a workflow, cartography information relating to the emergency site, or an up-to-date list of devices currently connected to the network 104. In an embodiment, the database 208 can be centralized, meaning that all data used in a workflow is stored in the database 208 on a single device 200. In alternate embodiments, the database 208 can be distributed, with each device 200 storing parts of information needed in a full workflow. In such embodiments, information can be shared between devices on demand.

In an embodiment, the system can be loaded onto a device and act as the control system for that device. For example, the system can be loaded onto a drone, and will serve to control its workflow, while directing it to automatically collect data using its different sensors and capabilities.

Figure 3:
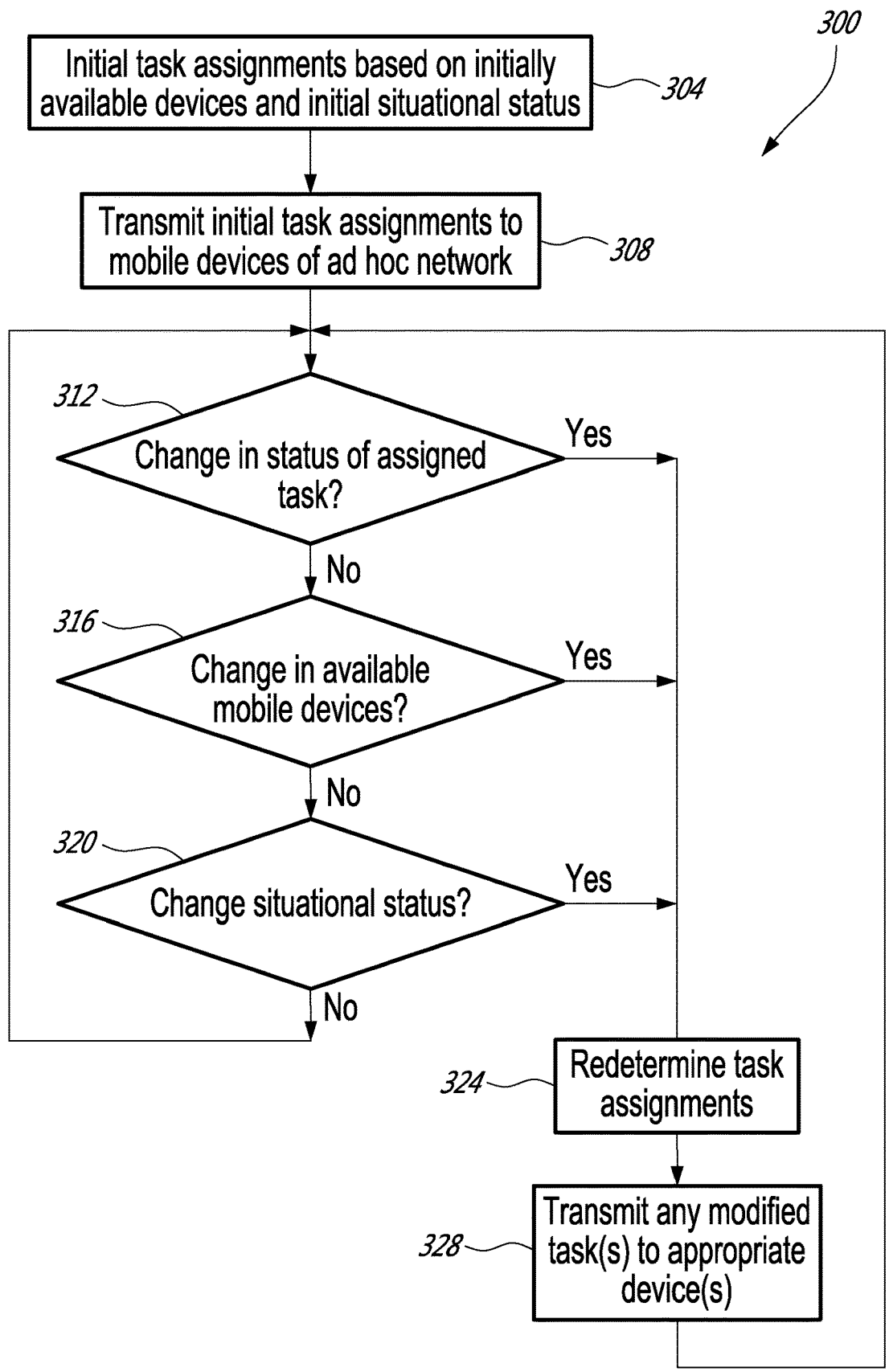
FIG. 3 illustrates a flowchart of the operational steps of a method 300 according to an example embodiment for managing workflow applied to task-executing users associated to mobile devices with a single ad hoc network.

Referring now to FIG. 3, therein illustrated is flowchart of the operational steps of a method 300 according to one example embodiment for managing workflow applied to task-executing users associated to mobile devices within a single ad hoc network. The method may be carried out on by a workflow management module implemented within the communication devices 200 of a single ad hoc network 104.

At 304, the workflow management module determines an initial set of task assignments to the initial subset of mobile devices that are available for data communication over the ad hoc network 104. Each transmitted task assignment is received at a mobile device. A given task assignment that is received at a given mobile device defines one or more real-world task to be completed by the task-executing user associated to the given mobile device. The task assignment may also define a deadline and/or priority of the real-world task. For example, the real-world task may be a task to be completed in the course of responding to the emergency situation.

The tasks defined in the initial set of task assignments and the recipient mobile devices of those task assignments is determined based on the user profiles associated to the mobile devices that are initially available for data communication over the ad hoc network. The workflow being applied by the workflow management module may define the set of tasks that need to be completed given the initial situational status and how those tasks are to be completed by the task-executing users that are initially connected to the ad hoc network.

At 308, the initial set of task assignments that were determined at step 304 are transmitted to the appropriate mobile devices associated to the task-executing users over the ad hoc network.

After transmitting the initial set of task assignments, the method proceeds to steps 312, 316 and 320 to monitor whether a workflow-affecting change has occurred. A workflow-affecting change herein refers to any change that may cause the workflow to be modified whereby the real-world tasks assigned by the workflow management module to the task-executing users associated to the mobile devices currently available for communication over the ad hoc network may also need to be modified.

At 312, the statuses of tasks that have already been assigned to task-executing users are monitored. Each mobile device associated to a task-executing user may transmit to the workflow management module an update pertaining to the status of an assigned task. For example, a task-executing user may input the update (ex: task complete, task delayed, task unachievable) via the I/O module 206 of a mobile device.

In response to receiving an update indicating that a change to an assigned task has occurred, the method proceeds to step 324 to redetermine the set of tasks that have already been assigned. This determination may be made based on the applicable workflow and the received update. The determination may also include modifying the applicable workflow, such as changing the current applicable workflow to another workflow. It will be appreciated that modifying the applicable workflow may also modify the tasks applicable. It will be understood that redetermining the set of tasks described herein encompasses both modifying the set of tasks based on the applicable workflow and modifying the applicable workflow as appropriate.

For example, in response to receiving an update that a task has been completed by a task-executing user, the task-executing user may be assigned another task to be completed. If an update indicates that a task is delayed or cannot be completed by a particular task-executing user, it may be determined at step 324 that that task should be assigned to another task-executing user.

At step 328, any modifications that are determined at step 324 are transmitted as at least one modified task assignment to at least one appropriate mobile device. The modified task assignment may define a modification to a task already assigned to a task-executing user and previously transmitted within a task assignment to a mobile device associated to that user. Alternatively, or additionally, the modified task assignment may define a new task to be completed by a given task-executing user and is transmitted to the mobile device associated to that given user.

At step 316, the ad hoc network is monitored to detect whether a change has occurred to the subset of mobile devices associated to task-executing users that are currently available for data communication over the ad hoc network. Where a change has occurred to the subset of mobile devices, the method proceeds to step 324 to redetermine the assignment of tasks based on the subset of mobile devices that are still available for data communication over the ad hoc network. The method may also transmit at step 328 at least one modified task assignment to at least one mobile device.

It will be appreciated that an ad hoc network may be prone to having one or more devices being unavailable for data communication over the ad hoc network. This may be due to the physical limitations of wireless communication within an ad hoc network. A mobile device of the communication devices 200 may be temporarily unavailable due to physical objects that restrict or prevent wireless communication. A mobile device may also malfunction or run out of battery power, which also causes it to be unavailable for data communication. Furthermore, a mobile device may be unavailable due to interference from other communication devices.

The monitoring of the ad hoc network to detect whether a change has occurred to the subset of mobile devices may include monitoring whether each of the subset of mobile devices is maintaining data communication over the ad hoc network. Accordingly, a change to the subset of mobile devices that are currently available corresponds to a given one of the mobile devices associated to a task-executing user becoming unavailable for data communication over the ad hoc network. The given mobile device being unavailable for data communication represents the task-executing user associated to that mobile device being unable to share or receive task-related updates within the ad hoc network.

Referring now to FIG. 4A, therein illustrated is a schematic diagram of the workflow management system 100 subsequent to a communication device being unavailable for data communication. In the illustrated example, communication device 200" is now unavailable for data communication, as denoted by broken lines representing communication links that are no longer available. For example, the device 200" is no longer available because it has been displaced to a geographical location where its communication link within the ad hoc network 104 cannot no longer be maintained.

In response to detecting the given mobile device being unavailable for data communication, the set of tasks that has already been assigned is redetermined based on the mobile device becoming unavailable at step 324. The redetermination may be made based on the user profiles stored on the mobile devices that are still available for data communication. For example, tasks that were assigned to the user associated to the now unavailable mobile device need to be reassigned to other users associated to mobile devices that are still available for data communication. Reassignment of tasks may also cause a change in the prioritization of tasks already assigned to a user.

Where reassignment is required, at least one modified task assignment is transmitted at step 328 to at least one mobile device still available for data communication over the ad hoc network.

Where the mobile device that has become unavailable for data communication previously contributed to implementation of the workflow management module 202, reorganization may be carried out within the system 100 to ensure continuation of the workflow management module 202.

The monitoring of the ad hoc network to detect whether a change has occurred to the subset of mobile devices may also include detecting a new mobile device associated to a new task-executing user becoming available for data communication over the ad hoc network. Accordingly, a change to the subset of mobile devices that are currently available corresponds to the new mobile device becoming available for data communication.

A mobile device may be newly available for data communication if it is displaced to a location that is sufficiently close to at least one communication device 200 of the ad hoc network and is authenticated to join the ad hoc network. For example, a plurality of teams of workers from different organizations may be responding to a situation. Due to organizational differences, a team may wish to only share information with workers of its own team. Therefore, workers from the same team use mobile devices that are connected in a single ad hoc network while being separate from ad hoc networks belonging to other teams. A new mobile device being available and authenticated may correspond to a worker from the same organization being ready to join the team (ex: the worker has just arrived at the emergency response site).

Figure 4B:
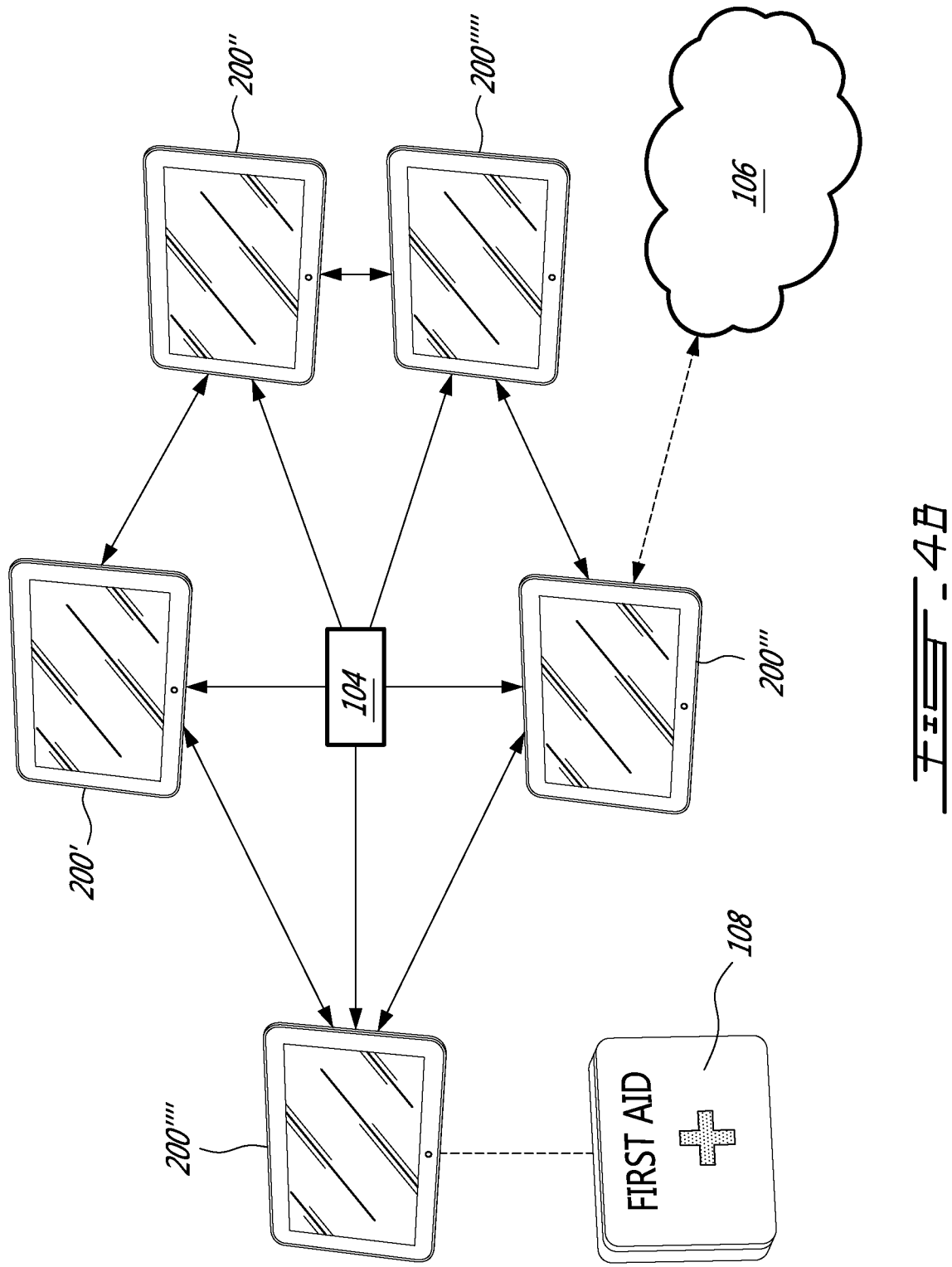
FIG. 4B illustrates a schematic diagram of the workflow management system subsequent to a new mobile device associated to a new task-executing user becoming available for data communication.

Referring now to FIG. 4B, therein illustrated is a schematic diagram of the workflow management system 100 subsequent to a new mobile device associated to a new task-executing user becoming available for data communication over the ad hoc network. In the illustrated example, a new mobile device 200''''' has already joined the ad hoc network 104 and established data communication links with existing communication devices 200 of the ad hoc network 104.

In response to detecting the new mobile device associated to a newly available task-executing user becoming available for data communication, the set of tasks that has already been assigned is redetermined at step 324 based on all of the mobile devices that are available after the addition of the new mobile device. Additionally, or alternatively, an additional (new) task may be assigned at 324 to the newly available task-executing user associated to the new mobile device.

The redetermination may be made based on the workflow-related data stored on the newly available mobile device. The workfolow-related data may include the user profile of the task-executing user associated to the newly available device. For example, the redetermination of tasks may be based on user profiles stored on mobile devices available after addition of the new mobile device.

For example, based on the user profile of the task-executing user associated to the newly available mobile device, a new task assigned to that user may correspond to a task that users of previously available mobile device were not qualified to execute.

For example, tasks already assigned to a given user associated to the given mobile device of the ad hoc network prior to the new mobile device becoming available may be modified after the new mobile device becoming available. The modification may correspond to removal of an assigned task, changing an assigned task or addition of a new task to the given mobile device. A task may be removed because it can be assigned to the newly available user associated to the newly available mobile device. A task may be added because it can be carried out in combination with the newly available user.

According to one example embodiment, the workflow-related data includes tasks completed by the task-executing user, and the set of tasks that has already been assigned is redetermined at step 324 based on tasks completed by the task-executing user associated to the newly available mobile device prior to it becoming available for data communication within the ad hoc network 104. For example, before being available within the ad hoc network 104, a user associated to the newly available mobile device may have completed some tasks that are relevant to the workflow being implemented within the ad hoc network. These tasks being completed may affect tasks assigned to other task-executing users.

In one example embodiment, the newly available mobile device may correspond to a mobile device that was previously available for data communication within the ad hoc network and subsequently became unavailable. While being unavailable for data communication, the user associated to that mobile device may have completed a particular task assigned to it. Furthermore, when the mobile device became unavailable for data communication, the particular assigned task that was assigned to it may have been reassigned to another user at step 324. Upon being available again and upon informing the workflow management module that the particular task has been completed, a modified task assignment may be transmitted to the other mobile device to remove the particular task that was previously reassigned to it.

At step 320, it is determined whether a change in the situational status has been received that would affect the workflow currently being applied. This change refers to any change to the situation at the response site other than updates regarding assigned tasks and changes to the subset of mobile devices currently available for data communication.

According to one example embodiment, the change to the situational status may be received within data received from a device that is external to the ad hoc network and over a communication link that is discrete from the ad hoc network. A communication link that is discrete from the ad hoc network 104 herein refers to a communication link that is not used for providing communication between communication devices 200 within the ad hoc network 104. Accordingly, the external device 106 is not operable to communicate within the ad hoc network 104 other than via its communication link with communication device 200'''.

At step 320, if it is determined that new information pertains to a change in situational status, the method proceeds to step 324 to redetermine the set of tasks that has already been assigned based on the new information. For example, due to a change in situational status at the response site, some tasks that have already been assigned may no longer be required, their priority may have changed or one or more new tasks must be assigned.

At step 328, a modified task assignment is further transmitted to at least one mobile device in response to the received information pertaining to a change in situational status.

Referring back to FIG. 1, the new information may be received by the communication device 200''' that is an external communication device and that has a communication link with an external device or network 106, such as a cloud server or the internet. The link between device 200''' and the external device or network 106 is discrete from the ad hoc network 104, as denoted by the broken line therebetween. The external device or network 106 may include information about the site being responded to.

According to one example embodiment, one of the communication devices 200 of the ad hoc network 104 implementing the workflow management system 100 is a sensing device that is operable to sense an environmental condition. The sensing device may be a standalone device or may be implemented within a mobile device associated to a user. A condition sensed by the sensing device is transmitted to the communication devices 200 that implement the workflow management module.

The environmental condition that is sensed and/or monitored may indicate a change in situational status at step 320, which may cause the tasks assigned to be redetermined at step 324 and a modified task assignment to be transmitted at step 328 to at least one mobile device.

According to one example embodiment, the subset of mobile devices associated to task-executing users of the ad hoc network 104 are located in geographical proximity of one another to define an operating zone. The operating zone corresponds to the geographical zone being currently occupied by the task-executing users associated to the mobile devices and in which zone the users are executing their assigned tasks. The sensing device is operable to sense the environmental condition within this operating zone.

It will be appreciated that due to the subset of mobile devices communicating over an ad hoc network, the mobile devices will typically be located close to one another. Furthermore, due to the mobile devices being associated to task executing users, the operating zone defined by the location of the mobile devices will correspond to the zone being served by the task-executing users. Accordingly, the environmental condition sensed within the operating zone will typically be relevant to the zone being served by the task-executing users.

According to various example embodiments, and as described elsewhere herein, at least one of the communication devices is an automated device. The automated device may be a self-propelled device, such as a mobile ground-based vehicle or an aerial vehicle (ex: drone).

Figure 4C:
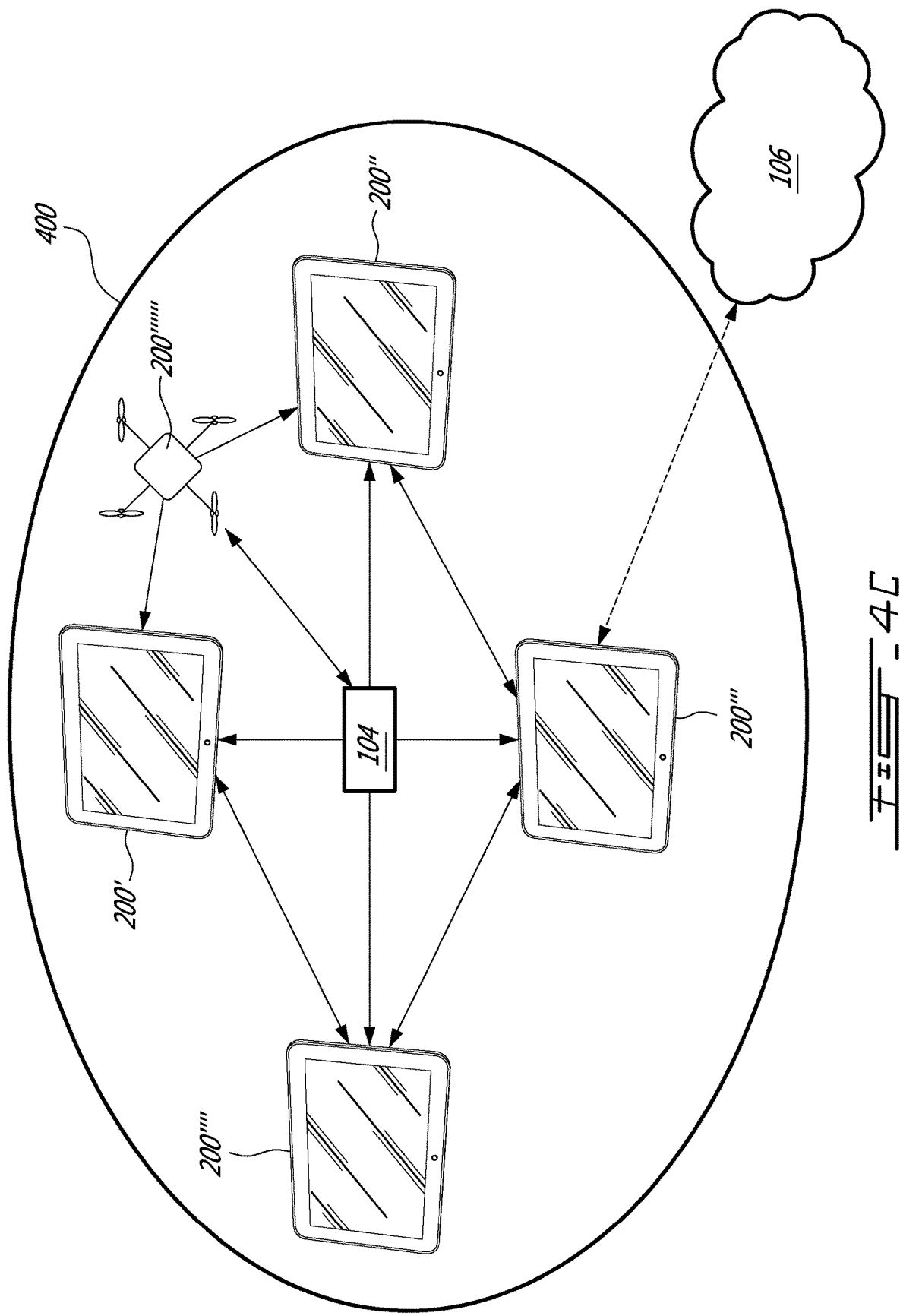
FIG. 4C illustrates a schematic diagram of a workflow management system in which the ad hoc network includes an automated device.

Referring now to FIG. 4C, therein illustrated is a schematic diagram of a workflow management system 100 in which the ad hoc network of connected communication device 200 includes an automated device 200''''. According to the illustrated example, the automated device 200'''' is a drone.

The automated device 200'''' is located within the operating zone 400 defined by mobile devices 200', 200'', 200''' and 200''''. According to one example embodiment, the automated device 200'''' may be operable to provide an intermediate communication link between at least two other communication devices of the ad hoc network. For example, a task-executing user associated to a given mobile device may be displaced such that the given mobile device is also displaced. During this displacement, the distance between the given mobile device and the nearest other communication device 200 may be increased, thereby weakening the communication link of the given mobile device to the ad hoc network. Accordingly, the automated device 200'''' may be operated to be displaced to a location close to the given mobile device, thereby acting as a node that provides an intermediate communication link between the given mobile device and another communication device 200 of the ad hoc network 104.

According to one example embodiment, the automated device 200'''' may also be operated as a sensing device. Accordingly, the automated device 200'''' may be displaced within the operating zone 400 and sense environmental conditions at different locations within the operating zone 400. This sensing of environmental conditions may provide a more accurate indication of changes in the situational status.

According to one example embodiment, the automated device 200'''' may be displaced outside of the operating zone 400. For example, the automated device 200'''' may have its own positioning system, such as its own GPS guiding system. When displaced outside of the operating zone 400, the automated device 200'''' may be located geographically such that it is temporarily unavailable for data communication within the ad hoc network. For example, the automated device 200'''' may be controlled by the workflow management module to be displaced outside of the operating zone 400.

The automated device 200'''' can acquire information pertaining to the situational status while outside of the operating zone. In one example embodiment, the automated device 200'''' is operable to establish a communication link with an external device while outside of the operating zone and acquire data pertaining to the situational status from the external device. For example, the mobile device 200 associated to task-executing users may be located in a remote geographical location. The automated device 200'''' is then controlled to be displaced outside of the operating zone 400 to another location where it can acquire a cellular signal and receive data over the cellular signal.

Additionally, or alternatively, the automated device 200'''' may also be a sensing device and is operated to acquire one or more environmental conditions from geographical locations outside of the operating zone.

Referring now to FIG. 4D, therein illustrated is schematic diagram of a workflow management system 100 in which the automated device 200'''' has been displaced outside of the operating zone 400. It will be appreciated that the automated device 200'''' is no longer available for data communication with the ad hoc network 104, as denoted by the absence of arrows indicating available data links. However, the automated device 200'''' has been displaced close to a cell tower 404 so as to establish a data link with the cellular network. The automated device 200'''' can further receive external information from external device or network 408 via the cell tower 404.

The automated device 200'''' is further operable to be displaced back inside the operating zone whereby it is available again for data communication within the ad hoc network 104. The external information received from outside the operating zone and/or the environmental conditions sensed from outside of the operating zone are then received at the workflow management module. This information is then evaluated at step 320 to determine whether a change situational status has occurred and in response to a situational status change occurred, the already assigned tasks are redetermined at step 324 and any modified task assignment is transmitted to at least one mobile device associated to a task-executing user at step 328.

The automated device 200''' may be operated based on commands issued to it by the workflow management module implemented within an ad hoc network.

According to various example embodiments, a workflow management system includes a plurality of groups of communication devices 200, each group of device 200 being connected within their own respective ad hoc networks. Accordingly, the communication devices 200 are arranged into a plurality of ad hoc networks. Furthermore, within each ad hoc network, at least one communication device 200 acts as dispatching device that implements a workflow management module 202 for that ad hoc network. As a result, for each ad hoc network, workflow for the mobile devices associated to task-executing users for that ad hoc network is managed generally separately from the management of workflow in other ad hoc networks. Management of workflow within ad hoc network is considered as being "generally separately" from other ad hoc networks in that the method of managing workflow with the ad hoc network only considers changes in status of assigned tasks and changes in available mobile devices within its ad hoc network on an ongoing basis, and only receives information regarding other ad hoc networks as information from an external source that may indicate a change in situational status. That is, a workflow management module of an ad hoc network may be limited to transmitting task assignments to only those mobile devices available within the same ad hoc network.

Figure 5:
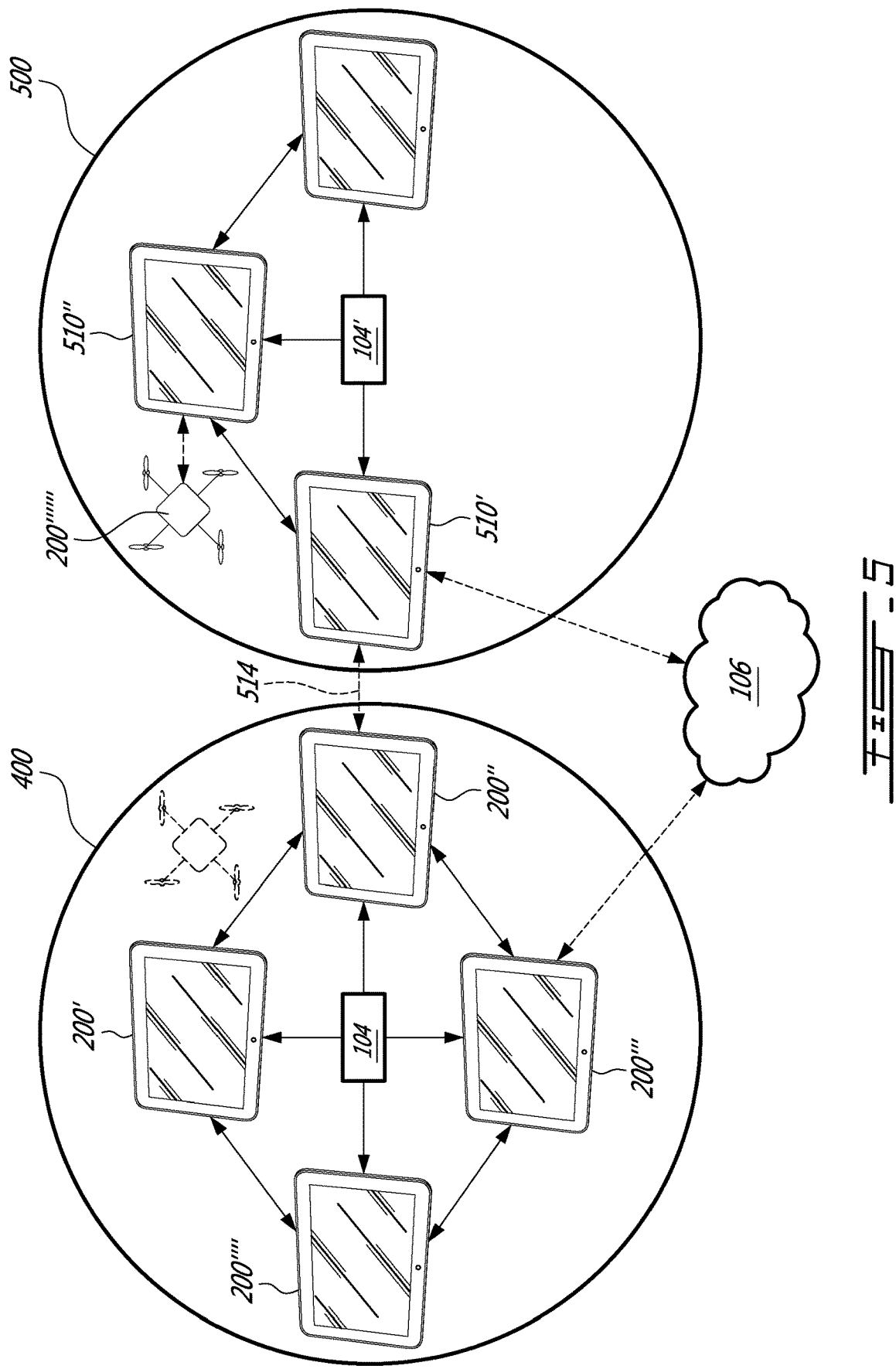
FIG. 5 illustrates a workflow management system having a plurality of ad hoc networks according to one example embodiment.

Referring now to FIG. 5, therein illustrated a workflow management system 500 having a plurality of ad hoc networks. In the illustrated example, a first set of communication devices 200 are in data communication with one another over a first ad hoc network 104. Within the first set of communication devices 200, a first subset of mobile devices are associated to a first group of task-executing users with each mobile device of the first subset being associated with a task-executing user of the first group and storing a user profile of that associated user. At least one of the communication devices acts as a dispatching device to implement a first workflow management module for assigning tasks to users associated to mobile devices of the first subset that are available for data communication within the first ad hoc network. It will be understood that workflow management module within the first ad hoc network 104 operates in the same manner as described hereinabove with reference to a workflow management system 100 having a single ad hoc network. For example, the first workflow management also carries out method 300 described herein for the mobile devices of the first subset. The first subset of mobile devices further defines a first operating zone 400.

Similarly, a second set of communication devices 510 are in data communication with one another over a second ad hoc network 104'. Within the second set of communication devices, a second subset of mobile devices are associated to a second group of task-executing users with each mobile devices of the second subset being associated with a task-executing user of the second group and storing a user profile of that associated user. At least one of the communication devices 510 of the second set acts as a dispatching device to implement a second workflow management module for assigning tasks to user associated to mobile devices of the second subset that are available for data communication within the second ad hoc network. It will be understood that the workflow management within the second ad hoc network 104' also operates in the same manner as described hereinabove with reference to a workflow management system 100 having a single ad hoc network. For example, the second workflow management also carries out method 300 described herein for the mobile devices of the second subset. The second subset of mobile devices further defines a second operating zone 520.

The first workflow management module implemented within the first ad hoc network 104 carries out workflow management for task-executing users associated to the first subset of mobile devices separately of the workflow management carried out by the second workflow management module implemented within the second ad hoc network 104' for task-executing users associated to the second subset of mobile devices. However, a workflow management module implemented within a given ad hoc network may receive workflow-related data from a communication device of another ad hoc network. The workflow-related data is treated as information from an external device that may indicate a change in situational status at step 320 and which may require redetermining assigned tasks at step 324 and transmitting modified task assignments to at least one mobile device at step 328.

For example, at least one of the communication devices of the first set acts as an externally communicating device that is operable to transmit and/or receive data to or from a device external to the first ad hoc network 104. Similarly, at least one of the communication devices of the second set acts as an externally communicating device that is operable to transmit and/or receive data to or from a device external to the second ad hoc network 104. In one example, the second externally communicating device receives workflow-related data from the first externally communicating device. This data is further received at the second workflow management module and a modified task assignment may be transmitted to at least one mobile device of the second subset in accordance. Similarly, the first externally communicating device may receive workflow-related data from the second externally communicating device.

Referring back to FIG. 5, communication device 200" of the first ad hoc network 104 acts as a first externally communicating device and communication device 510' of the second ad hoc network acts as a second externally communicating device. The communication device 200" is operable to transmit to the communication device of the second ad hoc network over a direct communication link 514. As illustrated, this link may be discrete from data connections within the first ad hoc network 104 and data connections within the second ad hoc network 104'.

The direct communication link between the first externally communicating device and the second externally communicating device may be a wireless connection. The direct communication link 514 will usually be unavailable and only becomes established when the first externally communicating device and the second externally communicating device are in geographical proximity of one another. For example in the illustrated example, the first and second externally communicating devices 210" and 510' are the communication devices from each of the first ad hoc network 104 and the second ad hoc network 104' that are closest to one another. In one example, the direct link is established only when the first operating zone 400 and the second operating zone 520 at least partially overlap geographically.

According to an example embodiment, the externally communicating device of a given ad hoc network may be operable to establish a data communication with an external device outside of the ad hoc network. Furthermore, the externally communicating device of another ad hoc network may also be operable to establish a data communication with the external device that is also located outside of the other ad hoc network. Accordingly, the externally communicating devices of both ad hoc networks may be in data communication with one another via the external device.

Referring back to FIG. 5, communication device 200''' of the first ad hoc network 104 may act as an externally communicating device to establish a data communication link with external device or network 106. Furthermore, communication device 510' of the second ad hoc network 104' may also act as an externally communicating device to establish a data communication link with the external device or network 106. Accordingly, communication device 200''' can send workflow-related data to the external device or network 106. This workflow-related data can be further received by the communication device 510' from the external device or network 106.

In some examples, the workflow-related data received from the communication device 200''' can establish a data communication link with the external device or network 106 at a first point in time and transmit the workflow-related data to the external device or network 106. The workflow-related data may be temporarily stored at the external device or network 106, during which time the communication device 200''' may be disconnected from the external device or network 106. The communication device 510' of the second ad hoc network can then connect to the external device or network 106 at a later point in time to receive the workflow-related data therefrom. Accordingly, the communication device 200' of the first ad hoc network 104 and the communication device 510' of the second ad hoc network do not need to be simultaneously in data communication with the external device or network 106 in order to share workflow-related data with one another.

The external device or network 106 may be a network with multiple access points such as the internet or cellular network and the externally communication devices of the first ad hoc network and the second ad hoc network may establish a data communication link therewith by connecting to any one of the access point.

According to an example embodiment, at least one communication device of at least one ad hoc network is an automated device that is operable to be displaced. More particularly, the automated device may be controlled to be displaced into geographical proximity with an externally communicating device of another ad hoc network, whereby it can establish a direct communication link with that externally communicating device. The automated device can then transmit workflow-related data to the externally communicating device of the other ad hoc network or receive workflow-related data from that device. The automated device may be further displaced to return to its ad hoc network.

Referring back to FIG. 5, it will be appreciated that automated device 200'''', which was previously part of the first ad hoc network 104 (as denoted by broken lines) has been displaced into proximity of communication device 510'' of the second ad hoc network 104' to establish a direct data communication link with it. The automated device 200'''' can then transmit workflow-related data of the first ad hoc network 104 to the communication device 510'' of the second ad hoc network. Alternatively, or additionally, the automated device 200'''' may receive workflow-related data of the second ad hoc network 104 from the communication device 510''. The automated device 200'''' may then be displaced to return into proximity of a communication device 200 of the first ad hoc network 104 and share any received workflow-related data of another ad hoc network with the workflow management module implemented within the first ad hoc network 104.

Continuing with FIG. 5, it will be appreciated that automated device 200'''' is displaced outside of the first operating zone 400 and has entered into the second operating zone 500. The automated device 200'''' may be temporarily unavailable for data communication with the second ad hoc network. After receiving workflow-related data from the communication device 510'' of the second ad hoc network or transmitting workflow-related to the communication device 510'' of the second ad hoc network, the automated device 200'''' is displaced back inside the first operating zone 400 to be again available for data communication within the first ad hoc network 104.

The first ad hoc network 104 and the second ad hoc network 104' may both include automated devices that act as externally communicating devices for their respective ad hoc networks. In one example, the automated device of the first ad hoc network 104 may be displaced outside of the first operating zone 400 and the automated device of the second ad hoc network 104 may also be displaced outside of the second operating zone 520. The automated devices of both operating zones may then meet up at a geographical location outside of both the first operating zone 400 and the second operating zone 520 to establish a direct data communication link with one another and share workflow-related data of their respective ad hoc networks.

Managing Changing Resources in the Network

The above-described system and method according to various example embodiments can be configured to provide a platform for responding to emergency situations, the platform being able to adapt to changing resources.

An ad hoc network may be formed of mobile devices associated to task-executing users having shared properties. For example, in an emergency response situation, the set of users associated to mobile devices that are part of the same ad hoc network will form a team of users that collaborate together when intervening at the response site. Additionally, the ad hoc network may include other communication devices that provide resources to the team of users. These resources may include data collecting devices (ex: sensing devices, automated devices) as well as tools available to the user (ex: supplies, medical supplies).

Using an ad hoc network to interconnect mobile devices being used by task-executing user provides speed and ease of set up while providing a platform for coordination of tasks through the workflow management module. While the use of an ad hoc network is more limited in the amount of information that is available to it than would otherwise be available when using a full network infrastructure, the ad hoc network is more easy and quick to set up, which is a useful property when responding to an emergency situation. Interconnecting users within a same team using the ad hoc network provides a base level of coordination and management of workflow amongst the users.

For example, each of the devices can provide the network with particular resources. The management module can delegate tasks to certain devices based on the resources available, and based on the needs of a current task in the workflow. When a new device joins the network with a new resource, the management module can be notified, and can delegate tasks to the new device should the new resources be required in a workflow. Similarly, when a device leaves the network, the management module can be notified so that it no longer delegates tasks to that device.

In an embodiment, one of the devices in the network 104 is designated as a master or a server, while the other devices are designated as clients. The master device can be responsible for managing the state of the workflow, and delegating tasks to other devices. However, if the master device leaves the network, the remaining devices can adapt by designating another one of the devices as the master. In some embodiments, all workflow data on the master device is replicated on the client devices. In this manner, each of the client devices is apt to act as the master device should the master device leave the network unexpectedly.

User Profiles

In an embodiment each mobile device can be configured to have stored thereon a user profile of a task-executing user using the device. The profile can include information which correlates a user to a particular type of worker in an emergency area. The profile can include information about the skills, knowledge (or expertise) and resources (or tools) available to a worker which may be useful in responding to an emergency situation. For example, a user profile could indicate that the user is a paramedic with access to an emergency vehicle. The profile can be shared with the management module so that it is aware that a paramedic is available should any workflow require one. Of course, in a network of devices, there can be a number of different users, each with a particular set of skills and/or resources. The management module can therefore determine which users are required to complete a given workflow or a portion of the workflow and dispatch those users accordingly.

In an embodiment, a communication device can be associated with a single user profile. However, in other embodiments, a single device could have a plurality of user profiles. One or several profiles can be activated based on which user is currently using the device, making that user's skills and/or resources available to the management module. Should a user log off, the resources are no longer available, and the management module can delegate tasks to other users who are currently available.

In an embodiment, the profiles can be used by the system to authenticate users, devices and their roles in the system. Authentication can occur in several different manners. For example, pre-created profiles can be downloaded from a cloud server, if a connection is available. Profiles can also be created on site by an administrator, which can be particularly useful when the system is operating in an isolated environment. Authentication can occur automatically or manually. For example, automated devices operating in the system, such as drones for example, can authenticate automatically using a secure connection with other devices, or with another team. Authentication can also occur manually, for example by trusted users who have already been authenticated by the system. In some embodiments, authentication can involve establishing a trust level with a device, establishing a degree of confidence with the information it collects and the tasks it accomplishes. The trust level can, for example, be established base on a physical location of a device or a user, and their proximity with other users or with items of interest in the emergency area.

In an embodiment, users can have access to workflows or to other modules in the system such as forms, maps, or visualizations of the state of workflows, and any other information relating to these modules. Access to this information can be adapted according to the profile of the user. For example, the data accessible by the user can be adapted according to the role and responsibilities of the, the time, or the user's geographical location.

Status of Devices

In an embodiment, each device can communicate its current status with other devices on the network. This status could be used in order to more efficiently dispatch resources. For example, the status could include Global Positioning System (GPS) coordinates of the device. The management module could then provide dispatch instructions to the device which is closest to the emergency situation, or closest to a necessary external resource. The positioning information could also be used to establish a level of trust between corresponding devices. For example, devices in close proximity could be treated as part of a single team, and related tasks in a workflow could be delegated within that team. As another example, the status could include the availability of the device. If a device reports that it is busy, the management module could delegate an unoccupied device to perform a particular task in a workflow.

Workflows

In an embodiment, various workflows can be stored in the memory of the communication devices. Each workflow can include a sequence of blocks (or unitary components) which correspond to steps in the workflow, with each step including a task or a plurality of tasks which must be delegated to a device or a user. The management module can follow the sequence of blocks in order to execute them in their proper order. The blocks can be arranged according to the needs of the workflow. For example, the blocks can be arranged in a linear sequence, or could be branched according to conditions. The blocks can also be arranged so that some blocks can be executed in parallel.

In some embodiments, the workflows can be premade and preloaded onto the devices. In other embodiments, the workflows can be created or customized by users. For example, several blocks could be arranged into modules which a user can assemble and arrange in order to form a complete workflow. Custom workflows can be stored locally on a device, or can be shared with other devices on the network. For example, if a particular workflow is not available on one device, it can be retrieved from another device on the network on demand.

In some embodiments, workflow information can be updated from a device or server external to the network 104. For example, if one device is connected to the internet 106, it could download new workflows, new modules, updates on the state of a workflow, or other resources from an external device, and save this information in its database. The new information can then be shared with the rest of the devices 200 on the local network 104.

In another example, a new device can enter the network 104 with updated workflow information. For example, this device could have been part of another network, which advanced a workflow to a particular step. Upon entering the network, the new device can share its workflow information with the existing devices on the network. The existing devices could save this information to their databases, and thereby copy the state of the other network, allowing them to pick up where the other network left off.

In an embodiment, the blocks can include fields of information to be populated. These fields can be populated automatically, or could require manual user input. For example, a block could require information relating to the position of the device, and a current time. The communication device could use an integrated Global Positioning System (GPS) receiver to determine its location, and use an integrated clock to determine the time. This information can be populated in the block automatically by the communication device. In another example, the block could require a measurement of a patient's vital information. The user could take the requested measurements using medical tools, and fill in the necessary information using an input component on the communication device.

Secure Forms

Figure 6A:
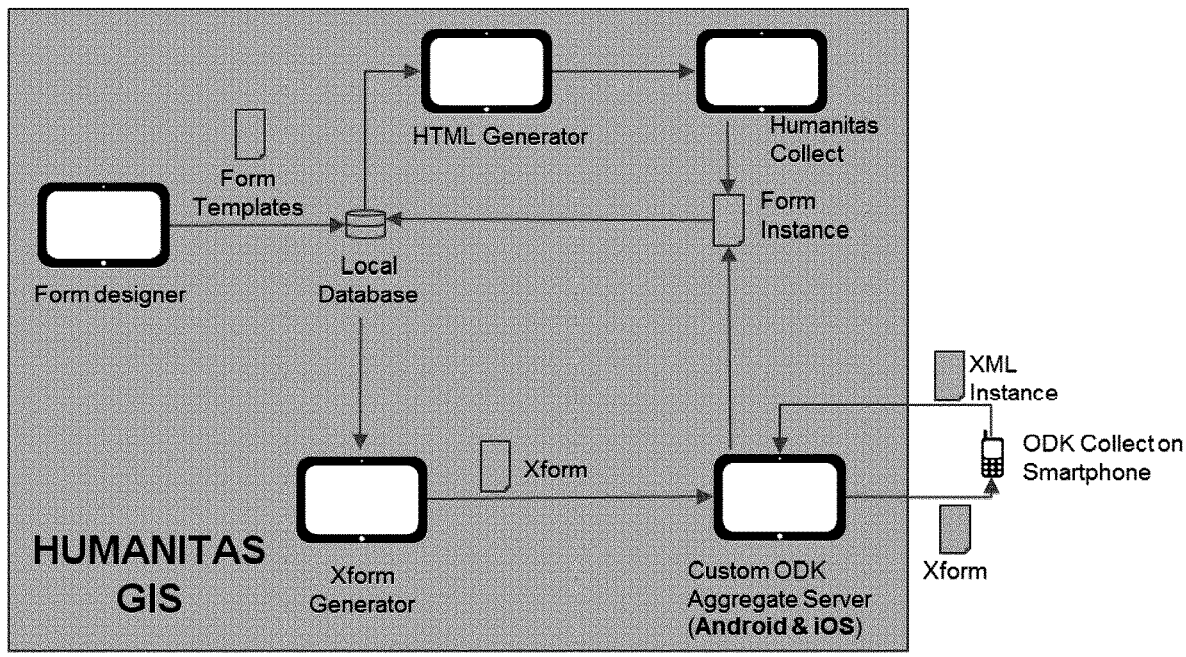
FIGS. 6A and 6B are schematics illustrating secured forms used in workflow blocks in the workflow management system of FIG. 1.
Figure 6B:
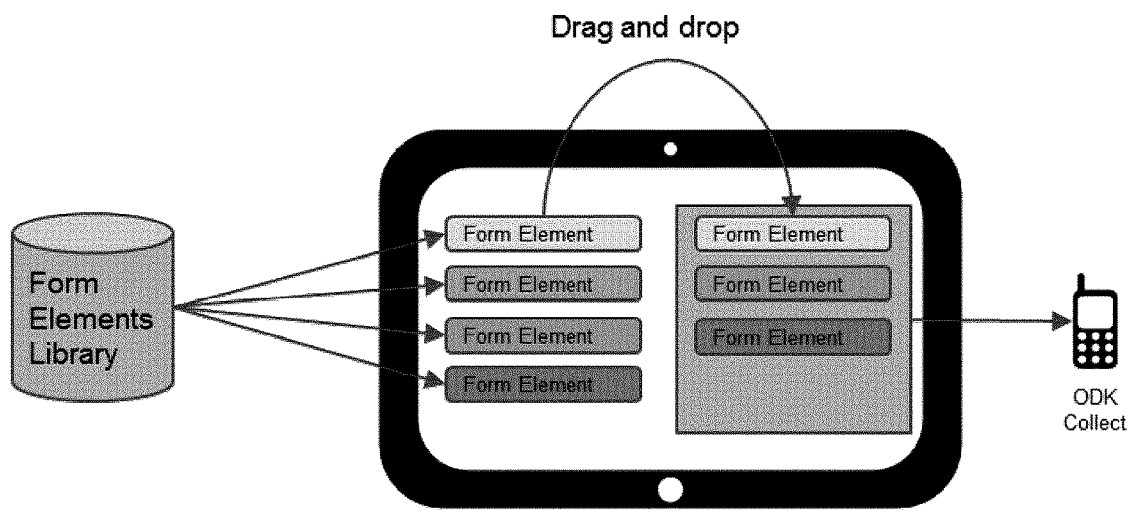

In an embodiment, the input of data can be made through information capture modules, such as secure forms. With reference to FIGS. 6A and 6B, the forms can be created from templates, saved to a database, and deployed in cross platform formats. The forms can include particular fields which must be populated by a user, and can be customized by a user through arranging form elements from a pre-created library. Form data can be entered directly on the communication device, or can be entered through auxiliary devices connected to the communication device.

In some embodiments, modular components of the system, such as forms and workflows, can be modified on site. For example, workflows and forms can be created or edited, before, during or after their execution by a user in the system.

Modifying Assignment of Tasks in Response to Changes

The above-described system and method according to various example embodiments allow assignment of tasks based on an applied workflow to be adjusted fluidly based on information made available to the workflow management module of an ad hoc network. This coordination is provided by responding appropriately to changes detected in available information.

As described elsewhere herein, assigned tasks may be modified based on a change in the task-executing users that are available within the ad hoc network. This addresses a limitation of ad hoc networks that some devices may be unavailable for data communication from time to time. Modifying assigned tasks addresses this situation by ensuring that tasks assigned to a user that becomes unavailable is properly reassigned if needed.

In an emergency response situation in an isolated environment, a mobile device being used by a worker may be unavailable because the worker has strayed too far from the other devices of the network. Modified tasks assignments are determined accordingly.

Assigned tasks may also be modified to respond to a new user being available. For example, in an emergency response situation, a new worker who is a doctor may be assigned tasks that only a doctor qualified to execute. These tasks may have previously been defined in the workflow but had not yet been assigned because of the mobile devices previously available for data communication over the ad hoc network, no mobile devices were associated to a worker who is a doctor. Similarly, where only a single doctor was available but the new user is another doctor, both doctors may be assigned a task that requires the simultaneous intervention of two doctors.

Assigned tasks may also be modified to respond to other information. This information may include environmental conditions, such as weather, new arrival of patients, etc. For example, an external communication device may be a centralized database being shared by a plurality of teams and/or organizations that correspond to other ad hoc networks. In an emergency situation, while teams may form many separate ad hoc networks, external communication devices may intermittently upload information, such as workflow-related data within that ad hoc network, to an external device or network. This allows sharing of information between teams.

The change in situational status may also correspond to a change in available resources. For example, communication device 200"" has a communication link with medical supplies 108 that is also discrete from the ad hoc network 104.

A change in situational status may be supplies running low or being restocked, which may affect which tasks users associated to mobile devices of the ad hoc network should be assigned and be carried out.

A Response Having Multiple Teams

Intervention at response site may include many teams of workers that come from different organizations or countries. Setting up a full network infrastructure to support communication within the teams and between the teams may be complicated and time consuming.

Interconnecting mobile devices of users within the same team into a single ad hoc network allows for quickly setting up the management workflow within teams. This may be effective as members of the same team may have similar operating processes, use the same resources or tools and carry out tasks that are related with one another. Where many teams are present, the result is having a plurality of disparate ad hoc networks each implementing their own workflow. For example, in an emergency response situation, there may be teams of paramedics, teams of patient transport, teams of hospital staff, etc.

Relaying of Workflow Between Teams

The above-described mechanisms can allow a workflow to progress from start to finish in a disconnected or isolated environment. Information can follow certain devices as they move about within an emergency zone, and shared with subsequent devices when needed. Accordingly, while teams each implement workflow management in a disparate manner, information may be shared between the teams. In particular, the status of workflow in one team may influence how tasks are assigned in another team.

For example, a team of first line responders is often called upon to evaluate and tag patients while taking care of local dangers. The tagged patients are then offloaded to a transport team who must dispatch the patients to an appropriate hospital according to the needs of the patient. Once at the hospital, a team of surgeons and other specialists will intervene according to data acquired by the team of first line responders and the transport team.

In such a scenario, each worker in each team can be provided with a mobile device. Due to their physical proximity, the devices in each team will form respective local ad hoc networks. In each network, one device can be automatically designated as a server while the rest are designated as clients, with the server acting as a local centralized workflow engine. The workflow state can be replicated on each of the client devices so that any one of them can take over as the server if needed.

The team of first responders can begin the workflow. During the workflow, they may be presented with several forms on their communication devices which they can complete by inputting patient data. When the first responders offload the patient to the transport team, the current workflow state of the responders' system is copied to the local workflow server of the transport team. Inside the transport team's system, the same replication of data occurs from the server to the clients.

The transport team then executes its own workflow and inputs patient data into their system according to the information requested by the workflow forms. Upon arriving at the hospital, the workflow state of both the transport team and first responders is copied to the hospital's system. There, the team of surgeons and other specialists treats the patients according to the data acquired and treatment provided by the previous teams.

In an embodiment, patients can themselves be associated with their own communication devices, which may take the form of a bracelet or a transport device for example. The patient's device could provide the network with data relating to the patient, and associate the patient with certain workflows. In the case that the patient deviates from a workflow, for example if the patient's transport is redirected to another hospital, other workflows can be activated which trigger certain actions. For example, an automated message could be sent to a referring hospital or to the patient's family, or instructions could be provided to modify the doses of medication to the patient, or to modify the amount of vital data captured.

To ensure interoperability between various teams each implementing an ad hoc network, a first communication protocol may be implemented for data communication within an ad hoc network. This first communication protocol may be applied to all communication devices within the ad hoc networks to ensure the new available mobile devices may be compatible to join any ad hoc network to enter into data communication with devices of that ad hoc network. Similarly, the first communication protocol allows any device to leave a given ad hoc network and join another ad hoc network. The first communication protocol may be a standard protocol known in the industry or may be a customized or proprietary communication protocol.

A second communication protocol may also be implemented to allow any communication device within an ad hoc network to communicate with another device that is external to the ad hoc network. The second communication may also be a standard protocol known in the industry or may be a customized or proprietary communication protocol.

Mapping

Figure 7A:
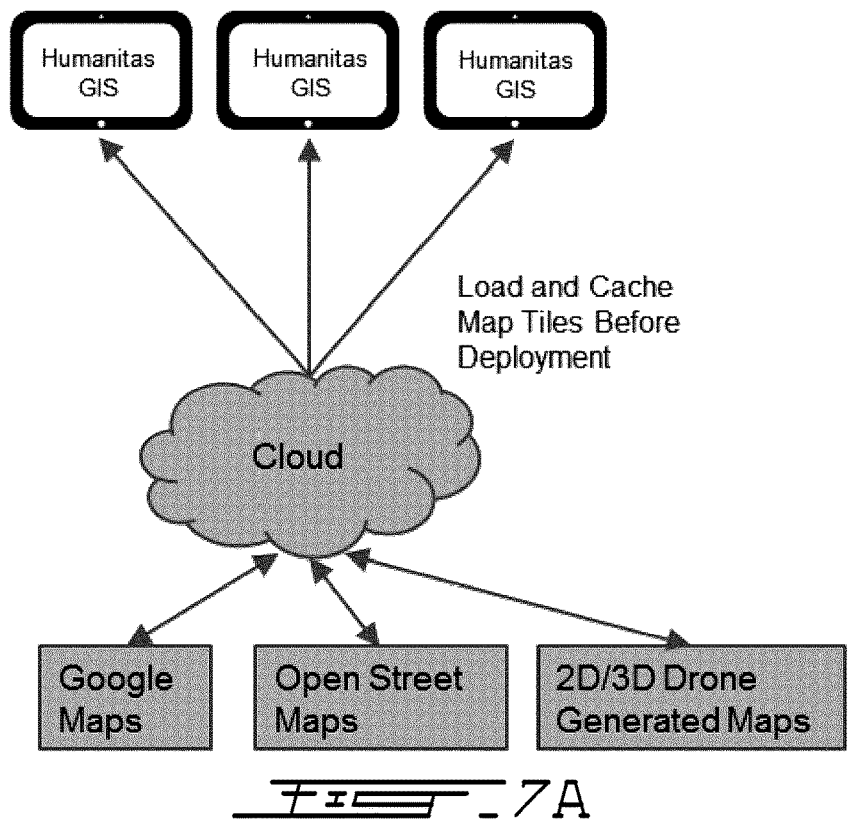
FIGS. 7A to 7C are schematics illustrating emergency site mapping using the system of FIG. 1.
Figure 7B:
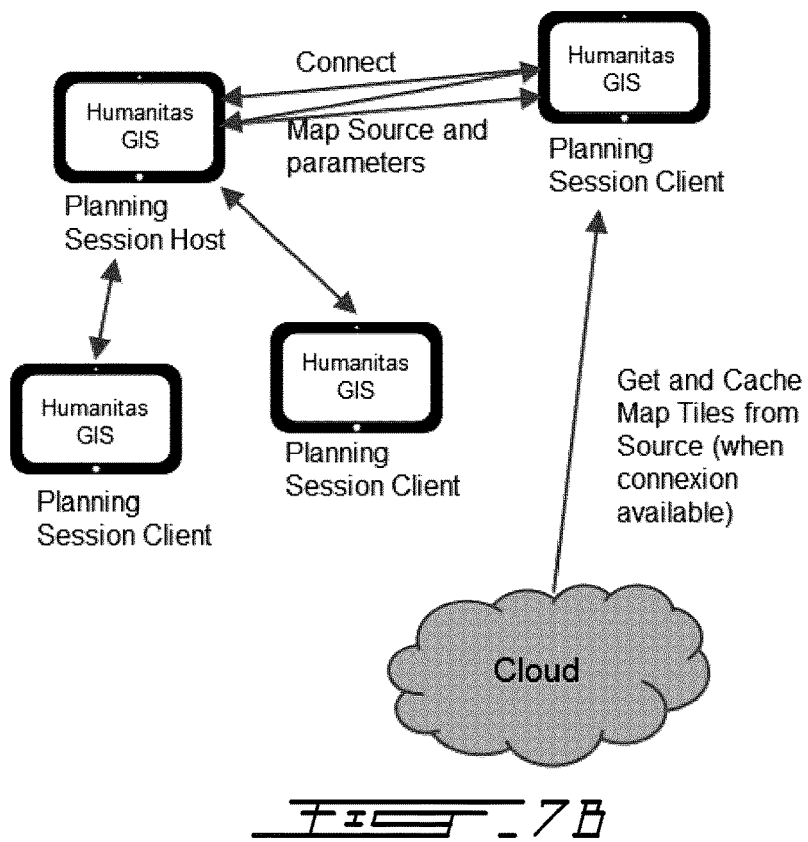

The above described mechanisms can also allow several devices to collaborate in order to share data. For example, the devices can be configured in order to provide each device with a map of an emergency area. With reference to FIG. 7A, prior to deployment, each communication device could be connected to a cloud or to the internet where it can retrieve map information from various sources. However, a connection to a central server is not always available to all devices. With reference to FIG. 7B, if one device has a connection to the internet, it can retrieve and cache map information. The information could then be shared with the device designated as the master device, which will in turn share the information with the remaining clients.

Figure 7C:
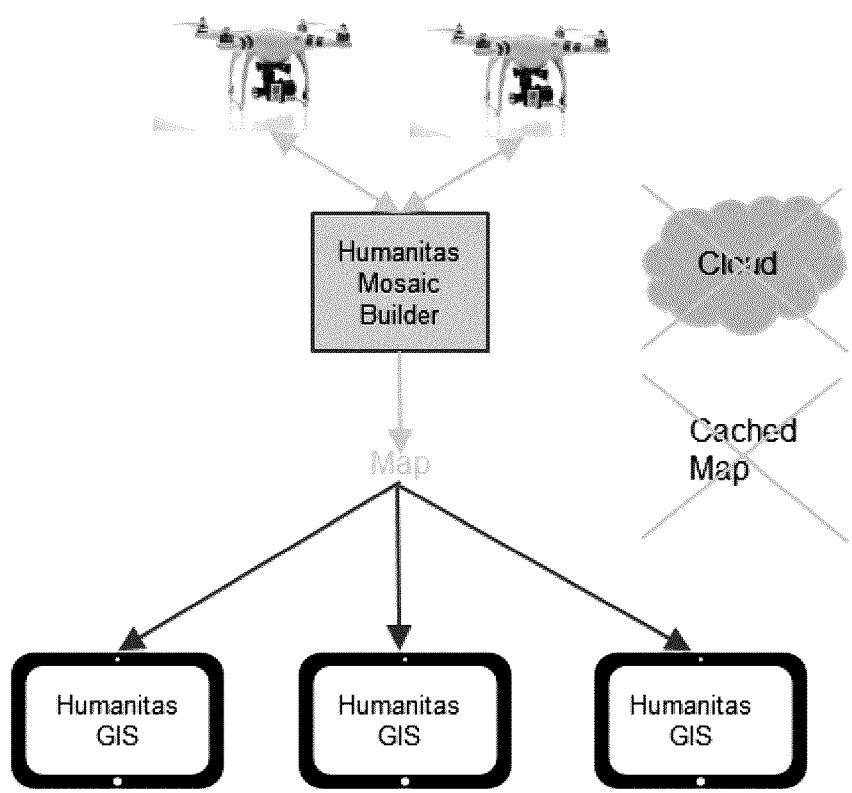

In some embodiments, the mapping mechanism can be completely decentralized, allowing the system to operate in a disconnected or isolated environment. With reference to FIG. 7C, if no internet connection is available, and if none of the devices has a cached map, the map can be built using emergency site recognition devices. In the illustrated example, the recognition devices are unmanned aerial vehicles, or drones, equipped with cameras or other sensors. The drones can be directed by the system to capture aerial images which are then composited to form a map. The map can then be communicated over the local network and stored on each one of the communication devices.

In an embodiment, the mapping data can be used to plan emergency response sites. With reference to FIG. 8, the mapping data can be used to generate a common view of an emergency area. A server can store a library of 3D assets which can be used to mark the location of resources in the area. The communication devices can create, move and update 3D objects in order to create a common view of the emergency area. The common view could, for example, provide a spatial visualization of a workflow and available resources, and aid dispatching resources when they are needed.

In an embodiment, workflow data and/or map data can be used to create an augmented reality view of the emergency area on the communications devices. With reference to FIG. 9, the communication devices can be provided with an augmented reality module. The augmented reality module can use workflow data in order to enhance a view of the emergency area. This enhanced view can serve to better visualize the workflow. For example, the device could show an area on the map where a workflow event occurred, a visual indication of the resources available at a specific location, or the status of a device or user at a particular location.

In an embodiment, the augmented reality module can visually represent data collected in a workflow with the help of algorithms and filters. The data can be analyzed and filtered according to the needs of a particular user or according to a state of a workflow. For example, for a user deployed in the field, the state of the workflow can be represented on a 3D map by using indicators corresponding to the geographical locations of elements in the workflow. The elements indicated on the map could be filtered such that only elements pertinent to the user's current tasks are displayed. For a user managing the workflow, the workflow could be represented as a 2D timeline, showing the current workflow, upcoming steps, or previously completed steps. As can be appreciated, the augmented reality representation could use 2D or 3D elements, or both at the same time. These representations can serve to improve the awareness of users in the field, for example by adapting the information being displayed according to the user's movements, profile, and current mission. Through adapting the information, the user can be provided with a more intelligent representation of the current workflow, along with a pertinent view of his surroundings in the emergency situation.

As can be appreciated, the present disclosure provides an adaptive platform for managing workflows and responding to emergency situations. The described configurations of the system are particularly advantageous in that they are optimized to operate efficiently in disconnected or isolated environments, which are common in emergency situations. If a central communication link is not available on a communication device in the system, the device is configured to operate on an ad hoc network with other devices in proximity. New networks can be formed when different devices come into proximity, allowing data to be exchanged as devices move about within an emergency area. Data can be cached on the devices, allowing the devices to update their information when available. Each device can be configured to operate as a master on a network, providing redundancy for when devices unexpectedly leave a network, allowing the workflow to progress without interruption.

When a connection to an external network or cloud server is available, the devices can receive updated information from a central location. This updated information can be shared with other devices in an ad hoc network if those devices do not have the same connection to the external network or cloud server. If updated information is not available from a central location, the system also provides means to generate new information. For example, the communication devices can include an interface allowing users to create or customize workflows using premade blocks or modules of several blocks. The new or customized workflows can be subsequently shared with other devices.

The system allows for users to be associated with profiles, defining roles for each particular user within a workflow. For example, some users can be classified as workers who can perform certain tasks in an emergency area according to the instruction provided from a communication device. Other users can be classified as super-users or administrators. These users can oversee the entire workflow using the visualization tools available to them through the communication devices. These users could also manage workflows by adding, removing or customizing blocks or steps to make certain emergency responses more efficient.

Intelligent Distributed Multi-UAV Management Ecosystem

In accordance with embodiment, an intelligent distributed multi-UAV management ecosystem provides a smart, autonomous, and secure solution for UAV collaboration in low-resources environments. The ecosystem may be running on smartphones mounted on UAVs that enhance the emergency response process. A smartphone is used as the computing unit (for example device 200 in FIG. 1) and a signal extender (such as WIFI, LTE, or any suitable radio frequency) is integrated directly on each UAV. The smartphones are connected through a flying mesh network that allows real-time collaboration between UAVs, thereby providing an affordable ecosystem for automated drone management and swarming, which may be used for humanitarian work, for example.

Swarming allows a large collection of aerial UAVs working together intelligently for an efficient emergency response system. Using configurable protocols, UAV communicate with one another on-the-fly to automate and enhance their operations. This advanced autonomous system is ideal for environments where communication infrastructure is destroyed or inaccessible.

As was previously mentioned, the system may be integrated with one or more drone(s). For example, in an embodiment, the device schematically represented as 200 in FIGS. 1 and 2 may include, be integrated within or be mounted on a vehicle, such as a UAV or drone. Thus the drone (or other vehicle) is provided with communication capabilities and to interact with other devices, either a standalone device (carried by a person) or a device mounted onto another apparatus such as a vehicle (including a drone). Each drone is further equipped with a camera and/or other sensor(s). For example, and as was previously mentioned, the drones may be directed by the system to capture aerial images. The captured images may be composited, either by the drone or an external processor, to form a map. Additionally, the images captured by the drone may be combined with aerial images captured by another drone to extend the mapped territory.

According to an embodiment, the device on the drone is adapted to establish a communication with another device mounted on another drone when they are detected within proximity of one another, and this may happen in flight, as the skilled person will readily understand. For example, this may correspond to automated devices of two ad hoc networks exchanging workflow-related data, as described elsewhere herein with reference to FIG. 5.

Similarly to engaging with another unitary device, the device 200 may enter into communication with a mesh network. For example, when a drone flies toward a particular site comprising a mesh network, it may be desirable to exchange information between the mesh network and the drone. For example, this may correspond to automated device of one ad hoc network being displaced to be in data communication with a mobile device of another ad hoc network, as described elsewhere herein with reference to FIG. 5.

The communication channel is established between devices, conditional to a validation, authentication and/or other security verification process. Once the communication channel is established, information between the devices may be exchanged.

More particularly, the device 200 is configured to trigger a specific process (for example via the above-described workflow system) when the device (for example, mounted on a drone or other vehicle or apparatus, or even standalone and carried by a person) meets another device, that is to say when the device enters into proximity with another device which may be isolated or part of a mesh network.

Each device may request particular information from the other device, for example map information (derived from aerial images captured by a first drone), weather information, network information collected from another site, energy level stored in the battery. Additionally, each drone may push specific information to the other drone, in some cases, for example a warning signaling potential danger along a course of flight or on the ground, status information regarding any of its components (defective motor, low battery level, etc.). It will be understood that any of the types of information listed as examples, may interchangeably be pulled and/or pushed information. It will be understood also that certain conditions may apply in order to determine which information is to be transmitted between the devices.

In one example embodiment, a plurality of drones may be provided to facilitate acquisition of information (ex: environmental conditions, mapping data) and sharing of information amongst teams. The plurality of drones may be configured to autonomously travel throughout a response site. At the response site in which there are a plurality of teams of workers using mobile devices that each form an ad hoc network and that each define an operating zone, the plurality of drones may be configured to travel from one operating zone to another and to locations outside any of operating zone. The drones may be able to share information with other drones according to example embodiments described herein.

In one example embodiment, a drone that is travelling autonomously may temporarily act as a communication device 200 of a given ad hoc network when it enters into the operating zone defined by that network. It can then transmit and receive any pertinent information with the workflow management module of that ad hoc network while being available for data communication within that ad hoc network.

In another example, a drone that is travelling autonomously may correspond to a device that is external to an ad hoc network. Accordingly, as a drone is displaced close to an operating zone of a given ad hoc network, an externally communicating device of the ad hoc network may establish a data communication link discrete from the ad hoc network with the drone to receive information from that drone. The information is then analyzed to determine whether a change in situational status has occurred. It will be appreciated that in this example, the plurality of drones that autonomously travel throughout a response site represents a data sharing network that is additional to the ad hoc networks. The plurality of drones form the data sharing network and share workflow-related data, information related to the situational status and/or information related to the response site amongst one another and further act as external devices to provide information to externally communicating devices of ad hoc networks that can affect workflow of teams of workers.

It will be understood that a vast spectrum of information may be exchanged depending on the particular configuration of the devices, and specific conditions. Example scenarios (non-exhaustively) include:

Two drones having respective trajectories which intersect, when approaching each other, communicate and control at least one of the drones to divert its trajectory, in order to avoid a collision between the drones.

Two drones having respective trajectories approach each other. One of the drones is controlled to change its trajectory based on information received from the other drone, i.e. danger ahead, collision ahead, bad weather, change of priority, urgent request to change its destination (for example to transport equipment or medicine from one site to another).

A first drone having mapped a particular territory meets a second drone inflight which has also captured mapping information of another territory; the drones transmit their respective capture information such that each drone has a more complete mapping of the territory.

A first drone having mapped a particular area meets a second drone having also mapped the same area but at an earlier time. The mapping information of the first drone is transmitted to the second drone to update the information stored on the second drone.

A drone carries information between two sites having distinct mesh networks. The information carried may be: status information relative to a resource site, for example, required resources (people, equipment, medicine, food water), etc., maintenance required for a particular equipment, such as the energy level of a generator, the battery level of devices within a mesh network (such status information may be retrieved automatically by means of sensors or other monitoring equipment or processing); a message destined for the destination site; etc.

The information carried between sites may be made by any number of intermediate devices. For example, a first drone having a first trajectory meets a second drone having another trajectory. The first drone transmits information having been retrieved from a first site associated to a first mesh network. The second drone later on, meets a third drone and transmits the received information to the third drone. The third drone eventually delivers the information to a second site associated with a second mesh network.

Each drone may be equipped with various sensors, such as infrared sensors, cameras, etc. which are connected with the processor of the device 200, in order to make inflight decisions (for example, change altitude depending on weather conditions, turn on a visibility light if travelling in cloudy conditions) and/or communicate with other drones, which may in turn process the information to control itself or further transmit the information to another device.

The device 200 is further adapted to recognize the capabilities of each drone and communicates with the corresponding sensors of the drone. For example, a drone having an infrared module will be recognized as having such sensor capabilities. More particularly, the device operates a "discovery module" to discover the sensors associated to the corresponding drone, an "anomaly detection module" which detects anomalies associated to recorded signals via a comparison with reference information, and a "health monitoring" module which detects anomalies in the components of the drone or in interactions between the components.

The ecosystem allows for drones to make decisions based on the sensor-captured information and to propagate this information irrespective of their "allegiance". For example, this may occur when a drone detects a collision or potential danger to be avoided, by deviation of its trajectory. This detected danger may further be communicated (with location information, speed, etc.) to neighboring drones, and if relevant, in urgent mode, and the new trajectory may be communicated to the other drones with the necessary authentication. Similar alert function applies to emergencies teams on the ground, where a particular alert signal may be triggered depending on the particular type of danger, to be communicated to a group of individual (previously authenticated) or broadcast to all.

It will be appreciated that the devices (either portable or mounted on a device or vehicle) are configured to respect a hierarchy, such that one device 200 may be controlled or overridden by another device (which may be a "master drone", another device which may be on the ground, and/or the like). For example, a master drone (either inflight or on the ground), may control a landing drone to deviate its landing course relative to the original trajectory, to land in a different zone. The overriding drone may be automatically or manually controlled, stationary or in flight. Learning capabilities are further integrated to allow a slave drone to adapt to the ecosystem formed by the devices.

Advantageously, the ecosystem has self-deploying capabilities and is provided with autonomous reconfiguration. Several drones can be activated on command (via a team) or indirectly (for example, if a threat is detected on site). The automated reconfiguration allows specific functions, for example, collaborative mapping of a zone via a plurality of drones. In addition, the reconfiguration of the drones and their auto-deployment may be responsive to reconfiguration of teams on the ground. For example, drones may "follow" specific team members (either physically or through association), and thus reflect team divisions and changes happening on the ground.

Advantageously, embodiments using drones provides extended the capabilities of the system of local mesh networks, particularly in remote sites in the absence of Internet access. Such collaboratively integrated drones provide an ecosystem having a cohesive synchronization and propagation of information with and between mesh networks, which may be particularly useful in emergency response procedures.

The ecosystem combines distributed services which run on a mesh network to achieve real-time collaborative intelligence between UAVs and emergency response teams. The system further integrates collision detection and safety mechanisms. By synchronizing secure databases, workflows, messaging, and real-time mapping, both within teams and within UAVs, emergency response teams are able to plan and manage operations in a more efficient way, and UAVs can adapt their behavior on-the-fly according to automated protocols encoded within the ecosystem, even in disconnected environments, such as in the context of search-and-rescue.

Embodiments of the above-described system are provided through affordable technology which facilitate the integration of third party modules and improve portability of missions and protocols between emergency teams.

An advantage of the present system is that it allows for the reduction of the complexity of systems needed to respond to emergency situations. This is accomplished by integrating each of the components required to respond to an emergency situation into a single system; by reducing the number of connections required between components, thus making the individual components less tightly coupled together; by building in intelligent redundancy measures to allow normal system function in case of failure, and to provide increased security during authentication; and by making the system highly adaptable, by providing advanced interfaces for performing finely grained personalization in the field. In the described embodiments, each of these features is present in the system, while allowing the system to function completely within an isolated environment.

It should be appreciated that in the described configurations, many different intelligent nodes can contribute to help respond to an emergency situation. Some of these nodes can be located on site, for example when decisions are made by a local communication device. Meanwhile, some nodes can be located externally, for example when decisions are taken by a cloud server.

A further advantage of the system is that it can facilitate and accelerate the deployment of temporary or ad hoc teams during emergency events. For example, the system can assist unstructured teams responding to catastrophic events by providing them with possible workflows to execute. As another example, the system can recognize steps that workers are performing, associating those steps with an existing workflow, and suggesting next steps based on an algorithm which takes into consideration several elements. Some of these elements could include information sought by the team through the system, data gathered by the team, GPS location of team members and their movements, and individual characteristics and profiles of team members.

Finally, it should be appreciated that although the system was described for use in responding to emergency situations, it could be used for other purposes as well. For example, the system can be used in simulations to evaluate the effectiveness of existing workflows. The system can be used to create simulations adapted according to the protocols of different organization participating in the simulations, taking into account the individuals participating in the simulation, the physical environment of the simulation, the tools available (such as UAVs, vehicles or other modules). In a simulation, the system can act as a central authority to manage the different events in the simulation, either automatically or by a user controlling the simulation. The system can then be configured to monitor tasks performed by individuals and devices, and monitor the simulation area using various sensors, allowing the performance of the participating teams and individuals to be measured and analyzed.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A workflow management system comprising:
a first set of communication devices in data communication with one another over a first ad hoc network, the first set comprising a subset of mobile devices each being associated with a task-executing user and storing a user profile of the task-executing user;
the set comprising a subset of at least one dispatching device implementing a workflow management module being configured to:
transmit an initial set of task assignments to one or more of the mobile devices based in part on the user profiles stored on the mobile devices, and
automatically determine at least a first modified task assignment and transmit the at least first modified task assignment to at least one mobile device in response to a change in the subset of mobile devices within the ad hoc network.

2. The workflow management system of claim 1, wherein the task-executing user is an emergency responder personnel and the user profile comprises information pertaining to the qualifications of the emergency responder.

3. The workflow management system of claim 1, wherein the workflow management module is configured for:
monitoring whether each of the subset of mobile devices is maintaining data communication over the ad hoc network;
wherein the change in the subset of mobile devices corresponds to detecting during the monitoring a given one of the mobile devices becoming unavailable for data communication over the ad hoc network; and
wherein the first modified task assignment is determined based on the user profiles stored on the mobile devices still in data communication over the ad hoc network after the given one of the mobile devices becoming unavailable.

4. The workflow management system of claim 1, wherein the workflow management module is configured for:
detecting a new mobile device becoming available for data communication over the ad hoc network, the new mobile device being associated to a newly available task-executing user; and
wherein the change in the subset of mobile devices corresponds to the new mobile device becoming available for data communication over the ad hoc network; and
wherein the at least one modified task assignment is determined based on workflow-related data stored on the new mobile device.

5. The workflow management system of claim 4, wherein the workflow-related data comprises a user profile of the newly available task-executing user associated to the new mobile device; and
wherein the at least one modified task assignment is determined based on the user profiles stored on the mobile devices in data communication over the ad hoc network after the mobile device becoming available.

6. The workflow management system of claim 4, wherein the workflow-related data comprises information pertaining to tasks completed by the newly available task-executing user during a time interval prior to the new mobile device becoming available for data communication over the ad hoc network; and
wherein the at least one modified task assignment is further determined based on the tasks completed by the newly available task-executing user.

7. The workflow management system of claim 4, wherein the workflow management module is further configured for transmitting a new task assignment to the new mobile device based on the workflow-related data stored thereon.

8. The workflow management system of claim 1, wherein at least one of the communication devices is operable to receive information from an external communication device over a communication link discrete from the ad hoc network and transmit the received information to the workflow management module; and
further transmitting at least one additional modified task assignment to at least one mobile device in response to the received information.

9. The workflow management system of claim 8, wherein the external communication device corresponds to one of a network of a plurality of drones configured to autonomously travel throughout a response site and share data therebetween.

10. The workflow management system of claim 1, wherein the subset of mobile devices are located in geographical proximity of one another to define an operating zone;
wherein the first set of communication devices comprises a sensing device operable to sense an environmental condition within the operating zone and to transmit the sensed environmental condition to the workflow management module; and wherein the workflow management module is further configured for transmitting at least one additional modified task assignment to at least one mobile device in response to the sensed environmental condition.

11. The workflow management system of claim 10, wherein the sensing device is operable to be displaced within the operating zone and sense environmental conditions at different locations within the operating zone.

12. The workflow management system of claim 10, wherein the sensing device is operable to provide an intermediate communication link between two mobile devices within the ad hoc network.

13. The workflow management system of claim 10, wherein the sensing device is operable for:
being displaced outside of the operating zone whereby the sensing device is temporarily unavailable for data communication within the ad hoc network;
sensing an environmental condition at a geographical location outside of the operating zone;
being displaced to return within the operating zone whereby it is available again for data communication within the ad hoc network;
transmitting the sensed environmental condition of the geographical location outside of the operating zone to the workflow management module; and
wherein the workflow management module is configured for further transmitting at least one additional modified task assignment to at least one mobile device in response to the sensed environmental condition at the geographical location outside of the operating zone.

14. The workflow management system of claim 10, wherein the sensing device is operable for:
being displaced outside of the operating zone whereby the sensing device is temporarily unavailable for data communication within the ad hoc network;
receiving workflow-related data from an external communication device located outside of the operating zone
being displaced to return within the operating zone whereby it is available again for data communication within the ad hoc network;
transmitting the received workflow-related data to the workflow management module; and
wherein the workflow management module is configured for further transmitting at least one additional modified task assignment to at least one mobile device in response to the received workflow-related data.

15. The workflow management system of claim 1, further comprising:
a second set of communication devices in data communication with one another over a second ad hoc network discrete from the first ad hoc network; and
wherein a communication device of the first set is configured to be temporarily in data communication with a communication device of the second set over a communication link discrete from the first ad hoc network and the second ad hoc network to receive information therefrom and to transmit the received information to the workflow management module;
wherein the workflow management module is configured for transmitting at least one additional modified task assignment to at least one mobile device in response to receiving the information from the second set of communication devices.

16. The workflow management system of claim 15, wherein the communication device of the first set is temporarily in data communication with the communication device of the second set when in geographical proximity of one another.

17. A workflow management system comprising:
a first set of communication devices being in data communication with one another over a first ad hoc network, the first set comprising a first subset of mobile devices associated with a first group of task-executing users, each mobile device of the first subset being associated with a task-executing user of the first group and storing a user profile thereof, and a first subset of at least one dispatching device implementing a first workflow management module being configured to transmit an initial set of task assignments to the first subset of mobile devices;
a second set of communication devices being in data communication with one another over a second ad hoc network discrete from the first ad hoc network, the second set comprising a second subset of mobile devices associated with a second group of task-executing users, each mobile device of the second subset being associated with a task-executing user of the second group and storing a user profile thereof, and a second subset of at least one dispatching device implementing a second workflow management module being configured to transmit task assignments to the second subset of mobile devices;
the first set of communication devices comprising at least one first externally communicating device and the second set of communication devices comprising at least one second externally communicating device, the second externally communicating device being operable to receive workflow-related data from the first externally communicating device and the second workflow management module being further configured to determine at least one modified task assignment, and transmit the at least one modified task assignment to at least one mobile device of the second subset of mobile devices in response to the received workflow-related data, wherein the workflow-related data includes tasks completed by the first externally communicating device.

18. The workflow management system of claim 17, wherein each task-executing user is an emergency responder personnel and the user profile comprises information pertaining to the qualifications of the emergency responder.

19. The workflow management system of claim 17, wherein the second externally communicating device is operable to receive the workflow-related data from the first externally communication device over a direct communication link therebetween.

20. The workflow management system of claim 19, wherein the direct communication link is discrete from the first ad hoc network and the second ad hoc network.

21. The workflow management system of claim 19, wherein the first set of communication devices are located in geographical proximity of one another to define a first operating zone;
   wherein the second set of communication devices are located in geographical proximity of one another to define a second operating zone; and
   wherein the direct link is established when the first operating zone and the second operating zone at least partially overlap.

22. The workflow management system of claim 17, wherein the first externally communicating device is operable to communicate with an external communication device;
   wherein the second externally communicating device is also operable to communicate with the external communication device; and
   wherein the second externally communicating device receives the workflow-related data via the external communication device.

23. The workflow management system of claim 22, wherein the external communication device corresponds to one of a network of a plurality of drones configured to autonomously travel throughout a response site and share data therebetween.

24. The workflow management system of claim 22, wherein the first externally communicating device is operable to communicate with the second externally communicating device over a cellular network.

25. The workflow management system of claim 17, wherein the first externally communicating device is operable to be displaced; and
   wherein the second externally communicating device receives workflow-related data from the first externally communicating device when the first externally communicating device is displaced in geographical proximity of the second externally communicating device.

26. The workflow management system of claim 25, wherein the first set of communication devices are located in geographical proximity of one another to define a first operating zone;
   wherein the second set of communication devices are located in geographical proximity of one another to define a second operating zone; and
   wherein the first externally communicating device is displaced to temporarily leave the first operating zone and temporarily enter the second operating zone to transmit workflow-related data to the second externally communicating device.

27. The workflow management system of claim 25, wherein the at least one first externally communicating device comprises a self-propelled communication device.

28. The workflow management system of claim 17, wherein the second externally communicating device is operable to be displaced; and
   wherein the second externally communicating device receives workflow-related data from the first externally communicating device when the second externally communicating device is displaced in geographical proximity of the first externally communicating device.

29. The workflow management system of claim 28, wherein the first set of communication devices are located in geographical proximity of one another to define a first operating zone;
   wherein the second set of communication devices are located in geographical proximity of one another to define a second operating zone; and
   wherein second externally communicating device is displaced to temporarily leave the second operating zone and temporarily enter the first operating zone to receive workflow-related data from the first externally communicating device.

30. The workflow management system of claim 28, wherein the at least one second externally communicating device comprises a self-propelled communication device.

31. The workflow management system of claim 17, wherein the workflow-related data comprises data pertaining to tasks assigned to and completed by the first group of task-executing users associated to the first subset of mobile devices.

32. The workflow management system of claim 17, wherein the first workflow management module is limited to transmitting task assignments to the first subset of mobile devices over the first ad hoc network; and
   wherein the second workflow management module is limited to transmitting task assignments to the second subset of mobile devices over the second ad hoc network.

33. A method of managing workflow of task-executing users each being associated to a mobile device connected over an ad hoc network, the method comprising:
   monitoring the ad hoc network to determine a set of mobile devices currently available for data communication over the ad hoc network;
   transmitting over the ad hoc network at least one initial task assignment to at least one currently available mobile device, each initial task assignment defining a task to be completed by the user associated to the mobile device;
   detecting a change in the set of currently available mobile devices; and
   automatically determining at least one modified task assignment and transmitting the at least one modified task assignment to the at least one currently available mobile device in response to the detected change in the set of currently available mobile devices, each modified task defining a modification to the defined task to be completed by the user associated to the mobile device.

34. The method of claim 33, wherein each mobile device stores a user profile of the task-executing user associated to the mobile device; and
   wherein the defined task is determined based on the user profiles stored on the currently available mobile devices.

35. The method of claim 34, wherein the task-executing users are emergency responder personnel and wherein the user profile stored on a given mobile device comprises information pertaining to the qualifications of the user associated to the given mobile device.

36. The method of claim 33, wherein detecting the change in the set of currently available mobile devices comprises detecting a given one of the mobile devices becoming unavailable for data communication over the ad hoc network; and wherein the at least one modified task assignment is determined based on the user profiles stored on the mobile devices still in data communication over the ad hoc network after the given one of the mobile devices becoming unavailable.

37. The method of claim 33, wherein detecting the change in the set of currently available mobile devices comprises detecting a new mobile device associated to a newly available task-executing user becoming available for data communication over the ad hoc network and receiving a user profile associated to the newly available task-executing user stored on the new mobile device; and
    wherein the at least one modified task assignment is determined based on workflow-related data stored on the new mobile device.

38. The workflow management system of claim 37, wherein the workflow-related data comprises a user profile of the newly available task-executing user associated to the new mobile device; and
    wherein the at least one modified task assignment is determined based on the user profiles stored on the mobile devices in data communication over the ad hoc network after the mobile device becoming available.

39. The workflow management system of claim 37, wherein the workflow-related data comprises information pertaining to tasks completed by the newly available task-executing user during a time interval prior to the new mobile device becoming available for data communication over the ad hoc network; and
    wherein the at least one modified task assignment is further determined based on the tasks completed by the newly available task-executing user.

40. The method of claim 37, further comprising transmitting a new task assignment to the new mobile device based on the user profile stored thereon.

41. The method of claim 33, further comprising:
    receiving information from an external communication device over a communication link discrete from the ad hoc network; and
    further transmitting at least one additional modified task assignment to at least one currently available mobile device.

42. The method of claim 33, the method further comprising:
    receiving a sensed environmental condition from a sensing communication device operable to communicate data over the ad hoc network and to sense an environmental condition;
    further transmitting at least one additional modified task assignment to at least one currently available mobile device in response to receiving the sensed environmental condition.

43. The method of claim 42, wherein the set of currently available mobile devices are located in geographical proximity of one another to define an operating zone and wherein the sensed environmental condition is sensed from within the operating zone.

44. The method of claim 43, further comprising
    controlling the sensing device to be displaced to a geographical location outside of the operating zone and sense an environmental condition at a location outside of the operating zone, the sensing device being temporarily unavailable for data communication with the ad hoc network when displaced outside of the operating zone;
    wherein the sensed environmental condition is received when the sensing communication device returns to the operating zone.

45. The method of claim 33, further comprising:
    receiving workflow-related data from a communication device connected to an external ad hoc network discrete from said ad hoc network; and
    transmitting at least one additional modified task assignment to at least one currently available mobile device in response to the received workflow-related data.

* * * * *